(12) United States Patent
Tatematsu et al.

(10) Patent No.: US 8,044,633 B2
(45) Date of Patent: Oct. 25, 2011

(54) DRIVE DEVICE OF ELECTRIC MOTOR

(75) Inventors: Kazutaka Tatematsu, Nagoya (JP);
Ryoji Mizutani, Nishikamo-gun (JP);
Eiji Yamada, Owariasahi (JP);
Nobuyuki Matsui, Nagoya (JP);
Takashi Kosaka, Nagoya (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 254 days.

(21) Appl. No.: 12/514,413

(22) PCT Filed: Mar. 14, 2008

(86) PCT No.: PCT/JP2008/055195
§ 371 (c)(1),
(2), (4) Date: May 11, 2009

(87) PCT Pub. No.: WO2008/114853
PCT Pub. Date: Sep. 25, 2008

(65) Prior Publication Data
US 2010/0071971 A1    Mar. 25, 2010

(30) Foreign Application Priority Data
Mar. 15, 2007    (JP) .................................. 2007-067206

(51) Int. Cl.
*H02P 27/04*    (2006.01)
(52) U.S. Cl. .......................... 318/801; 318/716; 318/139

(58) Field of Classification Search .................. 318/801, 318/716, 400.2, 400.3, 139, 400.09; 310/181
See application file for complete search history.

(56) References Cited

U.S. PATENT DOCUMENTS
2010/0301788 A1 * 12/2010 Chen et al. ................. 318/400.3

FOREIGN PATENT DOCUMENTS

| JP | 05-260796 A | 10/1993 |
| JP | 05-304752 A | 11/1993 |
| JP | 08-079912 A | 3/1996 |
| JP | 08-223706 A | 8/1996 |
| JP | 2004-229461 A | 8/2004 |
| JP | 2005-143157 A | 6/2005 |

* cited by examiner

*Primary Examiner* — Karen Masih
(74) *Attorney, Agent, or Firm* — Sughrue Mion, PLLC

(57) ABSTRACT

An electric motor has a field pole formed by a field current passing through a field winding. A voltage booting converter converts output voltage of a battery and outputs the voltage between a power source line and a grounding line. Field winding is electrically connected onto an electric current channel between battery and power source line and formed so that voltage switched by a switching element is applied to both ends. A controller controls the field current so as to adjust density of magnetic flux between a rotor and a stator by performing switching control on switching element and a switching element connected in parallel to field winding and converts the output voltage of battery into voltage in accordance with a voltage command value.

18 Claims, 15 Drawing Sheets

FIG.7
(i) Q1=ON
Q2,Q3=OFF
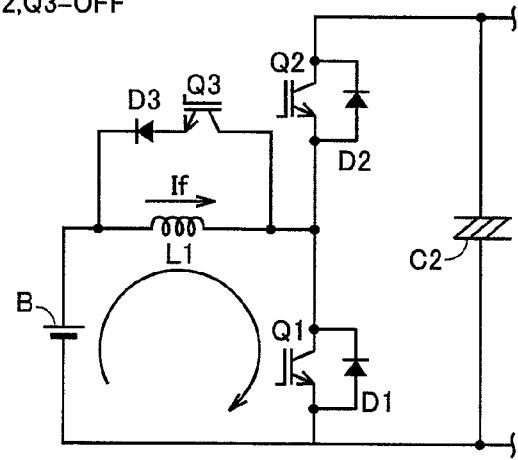
(ii) Q1,Q2,Q3=OFF
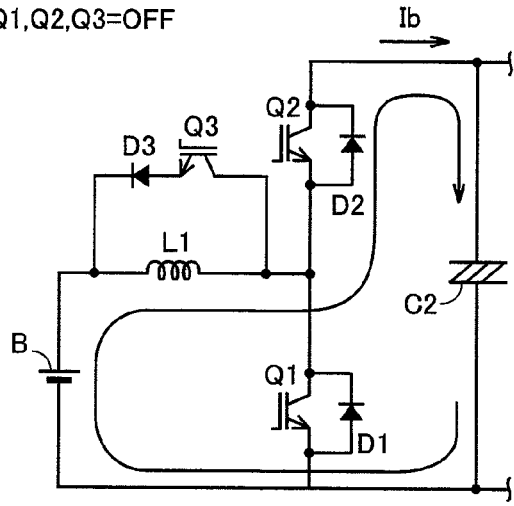
(iii) Q1,Q2=OFF
Q3=ON
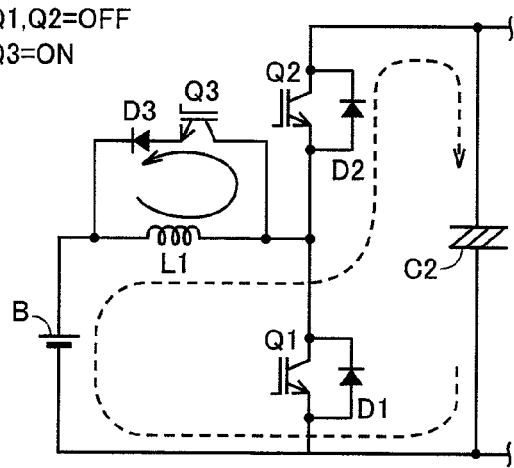

FIG.11

| OPERATION REGION | CONTROL MODE | SWITCHING CONTROL |
|---|---|---|
| I | NON-EXECUTION OF VOLTAGE BOOSTING CONTROL<br>NON-EXECUTION OF FIELD CONTROL | ONLY (iv) |
| II | NON-EXECUTION OF VOLTAGE BOOSTING CONTROL<br>EXECUTION OF FIELD CONTROL | (i)→(ii)→(iii)→(i)→(ii)→(iii)··· |
| III | EXECUTION OF VOLTAGE BOOSTING CONTROL<br>EXECUTION OF FIELD CONTROL | (i)→(ii)→(iii)→(i)→(ii)→(iii)··· |
| IV | REGENERATIVE MODE | ON/OFF CONTROL OF Q2<br>OFF-FIXATION OF Q3 |

FIG.12

(iv) Q4=ON
Q1,Q2,Q3=OFF

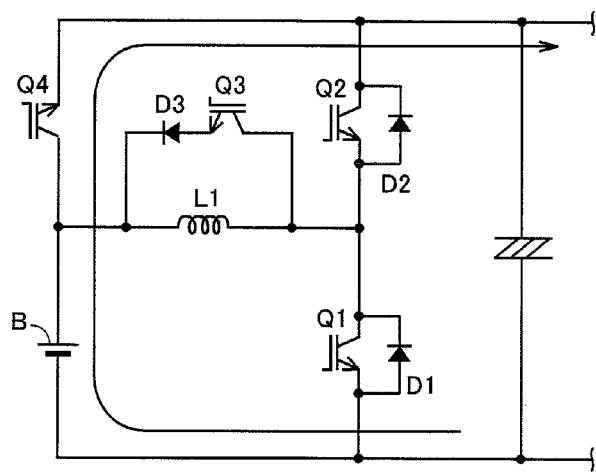

DRIVE DEVICE OF ELECTRIC MOTOR

TECHNICAL FIELD

This invention relates to a drive device of an electric motor, more specifically to a drive device of an electric motor for driving an electric motor capable of adjusting content of armature interlinkage magnetic flux.

BACKGROUND ART

Recently, a hybrid vehicle and an electric vehicle are drawing public attention as an eco-friendly vehicle. The hybrid vehicle is a vehicle having a motor driven not only by a conventional engine but also by a DC power source via an inverter as a mechanical power source. That is, the hybrid vehicle is to obtain the mechanical power source by driving the engine and converting DC voltage from the DC power source into AC voltage by the inverter so as to rotate the motor by the converted AC voltage.

The electric vehicle is a vehicle having a DC power source, an inverter and a motor driven by the inverter as the mechanical power source.

As a drive motor of such a hybrid vehicle and an electric vehicle, a permanent magnet type motor provided with a permanent magnet in a rotor and rotated by a magnetic action of poles due to the permanent magnet and a rotating magnetic field generated in a stator, a field winding type motor provided with a field coil in a rotor and rotated by a magnetic action of a component in the vertical direction to a rotation shaft of a magnetic field generated in the rotor by a field current passing through the field coil and a rotating magnetic field generated in a stator, and the like are taken into consideration.

For example, Japanese Patent Laying-Open No. 2004-229461 discloses a charge control device including a power generator having a field winding and plural-phase power generating winding, a rectifying circuit connected to a voltage output terminal of the power generator, a field current control switching element for controlling an electric current passing through the field winding of the power generator, connection switch means for switching and connecting the output side of the rectifying circuit to one of a high pressure storage cell and a low pressure storage cell, and control means for controlling ON/OFF of the field current control switching element and controlling switch of the connection switch means so as to charge the high pressure storage cell and the low pressure storage cell by respective reference voltage.

Here, torque generated from a motor is generally determined by magnetic flux passing from a rotor to a stator and an armature current passing through a stator winding. However, in the permanent magnet type motor, the magnetic flux between the rotor and the stator is determined by a permanent magnet to be used and maintained constant irrespective of the revolution speed. Therefore, for example as disclosed in Japanese Patent Laying-Open No. 5-304752, an AC electric motor for an electric vehicle for variably controlling content of magnetic flux by generating the magnetic flux by both a permanent magnet and a field pole provided on the rotor side is proposed.

According to the AC electric motor for the electric vehicle described in Japanese Patent Laying-Open No. 5-304752, the AC electric motor is a synchronous electric motor having the field pole on the rotor side, the permanent magnet is buried and an exciting coil is provided in the field pole. Then, field magnetic flux is generated by magnetic flux due to the permanent magnet and magnetic flux due to the exciting coil excited as required.

Further, in the hybrid vehicle and the electric vehicle, there is also consideration that the DC voltage from the DC power source is boosted by a voltage boosting converter and the boosted DC voltage is supplied to the inverter for driving the motor.

For example, Japanese Patent Laying-Open No. 2005-143157 discloses a motor control device for a vehicle including a field winding motor provided in the vehicle for generating the mechanical power, a battery, a voltage boosting and step-down inverter provided between the battery and the field winding motor, and a controller for performing field control and voltage boosting and step-down control in accordance with an operation state of the vehicle.

According to the above, the voltage boosting and step-down inverter is formed by an inverter unit, a voltage boosting and step-down unit and a capacitor. The voltage boosting and step-down inverter supplies electric power from the battery to a field winding motor for starting up an engine (a start-up motor), and supplies the electric power from the voltage boosting and step-down unit to field windings of the start-up motor and a field winding motor for driving rear wheels (a rear wheel drive motor). In this case, the controller performs control of supplying the electric power to the field windings by turning a field control circuit ON/OFF.

However, according to the AC electric motor for the electric vehicle described in Japanese Patent Laying-Open No. 5-304752, there is a need for a power circuit for supplying an exciting current to the exciting coil. In Japanese Patent Laying-Open No. 5-304752, a rotation transformer and a rectifier are provided in the interior of the electric motor and the exciting current is supplied from the exterior via the rotation transformer. Therefore, a physical constitution of the entire electric motor is enlarged in the axial direction relative to a main body of the electric motor and size and weight are not easily reduced.

In the motor control device for the vehicle described in Japanese Patent Laying-Open No. 2005-143157, there is also a need for a field control circuit for controlling power supply to the field windings. Therefore, there are problems that a physical constitution of the device is enlarged and cost is increased. These are against a demand of reducing size in the physical constitution of the device currently being increased from a view of ensuring interior space of the vehicle.

Therefore, this invention was made in order to solve the above problems and an object thereof is to provide a drive device of an electric motor capable of achieving both size reduction and higher output of the electric motor.

DISCLOSURE OF THE INVENTION

According to this invention, the drive device of the electric motor is a drive device of an electric motor including a field winding and having a field pole formed by a field current passing through the field winding. The drive device of the electric motor includes a power source, a converter converting output voltage of the power source and outputting the voltage between first and second power lines, and an inverter receiving the voltage between the first and second power lines and converting the voltage into electric power for driving and controlling the electric motor. The converter includes a voltage boosting switching element to be electrically connected between the field winding and the second power wire. The field winding is electrically connected onto an electric current channel between the power source and the first power line and formed so that voltage switched by the voltage boosting switching element is applied to both ends. The drive device of the electric motor further includes a field switching element to be connected in parallel to the field winding, and a controller controlling the field current and adjusting density of magnetic flux between a rotor and a stator by performing switching control of the voltage boosting switching element and the field switching element, and also controlling a voltage boosting current outputted from the converter to the first power line and converting the output voltage of the power source into voltage in accordance with a voltage command value.

According to the above drive device of the electric motor, a reactor serving as a constituent component of the converter is also used as the field winding of the electric motor. Therefore, without providing a power circuit for supplying an electric current to the field winding, it is possible to perform field control of the electric motor. Thereby, size of the drive device can be reduced. Further, since the field switching element connected in parallel to the field winding is provided, it is possible to control the field current supplied to the field winding by the switching control of the voltage boosting switching element and the field switching element and the voltage boosting current outputted from the converter independently from each other. Thereby, large torque can be obtained by stronger field control in a region where the revolution speed is low, and high efficiency is realized by the voltage boosting control in a region where the revolution speed is high. As a result, it is possible to achieve both size reduction of the drive device and higher output of the electric motor.

Preferably, the controller includes target current setting means for setting a target value of the field current and a target value of the voltage boosting current in accordance with the revolution speed of the electric motor and demanded torque, duty ratio calculating means for calculating a duty ratio between the voltage boosting switching element and the field switching element based on the target values of the field current and the voltage boosting current, and control signal generating means for generating a switching control signal for switching the voltage boosting switching element and the field switching element in accordance with the calculated duty ratio.

More preferably, the control signal generating means generates the switching control signal so that a time period when only the voltage boosting switching element is turned ON, a time period when the voltage boosting switching element and the field switching element are turned OFF, and a time period when only the field switching element is turned ON are provided in accordance with the duty ratio.

According to the above drive device of the electric motor, by adjusting the duty ratio between the voltage boosting switching element and the field switching element, it is possible to control the voltage boosting current and the field current independently from each other.

Preferably, the drive device of the electric motor further includes a bypass switching element forming the electric current channel between the power source and the first power wire so as to bypass the field winding. The duty ratio calculating means sets on-duty of the bypass switching element to be one in the case where the voltage command value is equal to the output voltage of the power source and the target value of the field current is not more than a predetermined value. The control signal generating means generates the switching control signal so that the bypass switching element is turned ON and the voltage boosting switching element and the field switching element are turned OFF in accordance with the on-duty.

According to the above drive device of the electric motor, in the case where there is no need for a voltage boosting operation and the field control, the bypass switching element is turned ON and the power source and the power wire are directly connected to each other without the converter. Therefore, it is possible to suppress power loss generated in the field winding and enhance energy efficiency.

Preferably, the electric motor is formed so as to be capable of generating drive force of a vehicle. The controller further includes means for calculating demand drive force of the vehicle based on an accelerator operation by a driver of the vehicle and calculating torque demanded for the electric motor from the calculated demand drive force of the vehicle, and means for setting the voltage command value in accordance with the revolution speed of the electric motor and the torque demanded for the electric motor. The duty ratio calculating means calculates the duty ratio between the voltage boosting switching element and the field switching element based on the target value of the field current in the case where the revolution speed of the electric motor is in a predetermined region of the revolution speed where the voltage command value is equal to the output voltage of the power source. The control signal generating means generates the switching control signal so that a time period when only the voltage boosting switching element is turned ON, a time period when the voltage boosting switching element and the field switching element are turned OFF, and a time period when only the field switching element is turned ON are provided in accordance with the duty ratio.

Preferably, the duty ratio calculating means calculates the duty ratio between the voltage boosting switching element and the field switching element based on the target values of the field current and the voltage boosting current in the case where the revolution speed of the electric motor exceeds the predetermined region of the revolution speed.

According to the above drive device of the electric motor, the field control of the electric motor and the voltage boosting control can be performed independently from each other in accordance with the demand drive force of the vehicle. Therefore, large torque can be obtained by the stronger field control in a region where speed of the vehicle is low, and high efficiency is realized by the voltage boosting control in a region where speed of the vehicle is high. As a result, it is possible to achieve the size reduction of the drive device and realize improvement in a running property of the vehicle due to higher output of the electric motor.

Preferably, the drive device of the electric motor further includes a bypass switching element forming the electric current channel between the power source and the first power wire so as to bypass the field winding. The duty ratio calculating means sets on-duty of the bypass switching element to be one in the case where the torque demanded for the electric motor is less than maximum torque to be outputted by the electric motor. The control signal generating means generates the switching control signal so that the bypass switching element is turned ON and the voltage boosting switching element and the field switching element are turned OFF in accordance with the on-duty.

According to the above drive device of the electric motor, due to relatively small torque demanded for the electric motor, in the case where there is no need for the voltage boosting operation and the field control, it is possible to improve fuel consumption of the vehicle by suppressing the power loss generated in the field winding and improving the energy efficiency.

Preferably, the electric motor includes a rotatable rotation shaft, a rotor core fixedly installed in the rotation shaft, a magnet provided in the rotor core so that a pair of poles of different magnetic properties are aligned in the radial direction of the rotor core, a stator core formed in a tubular shape, a field yoke provided in an outer periphery of the stator core, and field winding formed so as to be capable of controlling density of magnetic flux between the rotor core and the stator core by forming a magnetic circuit between the field yoke and the rotor core.

According to the above drive device of the electric motor, in the electric motor capable of variably controlling armature interlinkage magnetic flux, it is possible to form a compact rotor.

Preferably, the rotor core has a tubular first rotor core formed by laminating a plurality of steel plates and a second rotor core provided in an inner periphery of the first rotor core and made of an integrally molded magnetic material. The field yoke is made of an integrally molded magnetic material.

According to the above drive device of the electric motor, since magnetic resistance in the axial direction of the second rotor core and the field yoke is smaller than magnetic resistance in the axial direction of the first rotor core, it is possible to suppress loss of magnetic energy to be smaller.

Preferably, the rotor core further has a protruding polar unit provided in an outer surface of the first rotor core so as to protrude towards the outside in the radial direction. The magnet is provided in the outer surface of the first rotor core at a position adjacent to the protruding polar unit in the circumferential direction.

According to the above drive device of the electric motor, since an outer periphery surface of the rotor core can function as an output region of a magnetic line and an intake region of the magnetic line, it is possible to enhance utilization efficiency of the outer periphery surface. As a result, it is possible to form a compact rotor.

Preferably, the magnet has a first magnet and second magnets provided at positions adjacent to the first magnet in the circumferential direction. The first magnet and the second magnets are provided so that poles of parts positioned in the outer surface of the first rotor core are different from each other.

According to the above drive device of the electric motor, since content of magnetic flux from the magnet can be increased, it is possible to obtain larger torque.

Preferably, the magnet has a first magnet and a second magnet provided in an outer surface of the first rotor core so as to be adjacent to each other in the circumferential direction. The first magnet is formed so as to be longer than the second magnet in the axial direction of the rotor core. The first rotor core is formed between the first magnets and at a position adjacent to the second magnet in the axial direction of the rotor core and has a protruding polar unit provided so as to protrude towards the outside in the radial direction.

According to the above drive device of the electric motor, since the content of the magnetic flux from the magnet can be increased, it is possible to obtain larger torque.

Preferably, the magnet is buried in the first rotor core.

According to the above drive device of the electric motor, it is possible to effectively utilize both magnet torque (attractive and repulsive force between the permanent magnet and the coil) and reluctance torque (force of making a curve of the magnetic line to be straight).

Preferably, the electric motor includes a rotatable rotation shaft, a rotor core fixedly installed in the rotation shaft, a protruding polar unit provided in an outer surface of the rotor core so as to protrude towards the outside in the radial direction, a stator core formed in a tubular shape, a field yoke provided in an outer periphery of the stator core, and field winding formed so as to be capable of controlling density of magnetic flux between the rotor core and the stator core by forming a magnetic circuit between the field yoke and the rotor core.

According to the above drive device of the electric motor, since the protruding polar unit is provided in the rotor core in the electric motor capable of variably controlling the armature interlinkage magnetic flux, it is possible to suppress leakage of the magnetic flux from the stator core. As a result, it is possible to increase the armature interlinkage magnetic flux so as to increase the torque.

Preferably, the rotor core has a tubular first rotor core formed by laminating a plurality of steel plates and a second rotor core provided in an inner periphery of the first rotor core and made of an integrally molded magnetic material. The field yoke is made of an integrally molded magnetic material.

According to the above drive device of the electric motor, since the magnetic resistance in the axial direction of the second rotor core and the field yoke is smaller than the magnetic resistance in the axial direction of the first rotor core, it is possible to suppress the loss of the magnetic energy to be smaller.

Preferably, the electric motor includes a stator core formed in a tubular shape, a field yoke provided in an outer periphery of the stator core, a rotation shaft rotatably provided on the inner periphery side of the stator core, a first rotor core and a second rotor core fixedly installed in the rotation shaft so as to be adjacent to the rotation shaft along the axial direction of the rotation shaft, a first magnet fixedly installed in the rotation shaft positioned between the first rotor core and the second rotor core with a pair of poles to be arranged in the axial direction of the rotation shaft, a first protruding polar unit provided in an outer surface of the first rotor core so as to protrude towards the outside in the radial direction, a second magnet provided at a position adjacent to the first protruding polar unit in the circumferential direction, a second protruding polar unit provided in an outer surface of the second rotor core so as to protrude towards the outside in the radial direction and deviate from the first protruding polar unit in the circumferential direction, a third magnet provided at a position adjacent to the second protruding polar unit in the circumferential direction, and field windings formed so as to be capable of controlling density of magnetic flux between at least one of the first rotor core and the second rotor core and the stator core by forming a magnetic circuit between at least one of the first rotor core and the second rotor core and the field yoke.

More preferably, the second magnet and the third magnet are provided so that poles of parts positioned in the outer surfaces of the first rotor core and the second rotor core respectively are different from each other.

More preferably, the first rotor core and the second rotor core respectively have tubular outer rotor cores formed by laminating a plurality of steel plates and inner rotor cores provided in inner peripheries of the outer rotor cores and made of an integrally molded magnetic material. The field yoke is made of an integrally molded magnetic material.

According to the above drive device of the electric motor, the second magnet and the third magnet respectively provided in the first rotor core and the second rotor core regulate flow of the magnetic flux from the first magnet so as to reduce the leakage of the magnetic flux. Therefore, since the magnetic flux from the first magnet cooperates with the magnetic flux generated by the field winding, it is possible to generate large torque in a low revolution speed region.

According to this invention, in the drive device for driving the electric motor capable of variably controlling content of the armature interlinkage magnetic flux, it is possible to achieve both the size reduction of the drive device and higher output of the electric motor.

BRIEF DESCRIPTION OF THE DRAWINGS

FIG. 7 is a view for illustrating switching control of switching elements Q1 to Q3 by a controller.

FIG. 11 is a view for illustrating a relationship between an operation region where demand output of the electric motor belongs to and an optimal control mode.

FIG. 12 is a view for illustrating the switching control of a switching element Q4 by the controller.

BEST MODES FOR CARRYING OUT THE INVENTION

Figure 1:
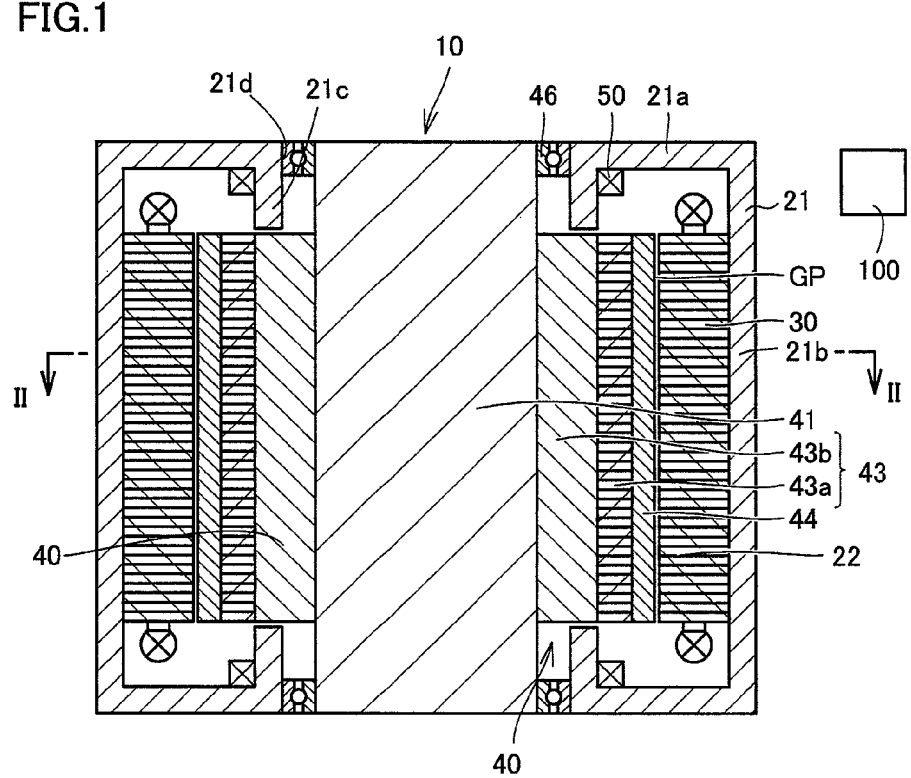
FIG. 1 is a sectional side view of an electric motor applied to a drive device of the electric motor according to an embodiment of this invention.

With reference to the drawings, an embodiment of the present invention will be described in detail below. It should be noted that the same or corresponding parts in the drawings are given the same reference numerals and a description thereof will not be repeated.

[Configuration of Electric Motor]

Figure 2:
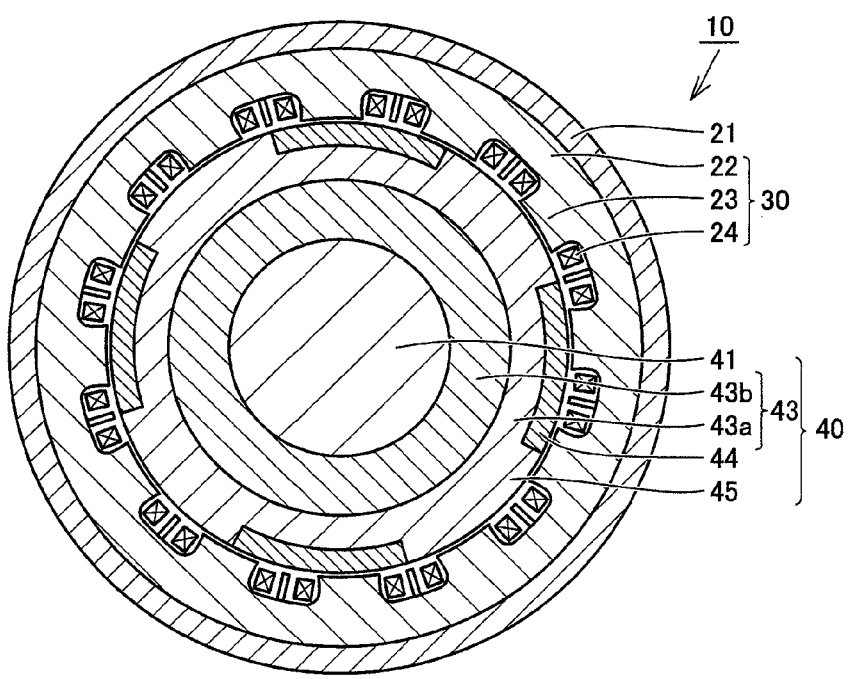
FIG. 2 is a sectional view taken along line of FIG. 1.

FIG. 1 is a sectional side view of an electric motor applied to a drive device of the electric motor according to the embodiment of the present invention. FIG. 2 is a sectional view taken along line II-II of FIG. 1.

With reference to FIGS. 1 and 2, an electric motor 10 is provided with a rotation shaft 41, a rotor 40 fixedly installed in rotation shaft 41, a field yoke 21 provided in an outer periphery of a stator 30, and a field coil 50.

An air gap GP is provided between rotor 40 and stator 30 so that rotor 40 and stator 30 are arranged slightly apart from each other in the radial direction.

Rotor 40 includes a rotor core 43 fixedly installed in rotation shaft 41, and a magnet 44 provided in an outer surface of rotor core 43.

Rotor core 43 is formed by a laminating rotor core 43a formed in a cylindrical shape, and a compact rotor core 43b provided in an inner periphery of laminating rotor core 43a. Compact rotor core 43b is made of an integral magnetic material, specifically made of soft magnetic composites (SMC).

Laminating rotor core 43a is formed by laminating a plurality of electromagnetic steel plates in the axial direction. Magnetic resistance in the axial direction is larger than magnetic resistance in the radial direction and the circumferential direction due to a gap generated between the electromagnetic steep plates. Therefore, in the interior of laminating rotor core 43a, a magnetic line from the magnet does not easily passes through in the axial direction but easily pass through in the radial direction and the circumferential direction.

Meanwhile, since compact rotor core 43b is made of the soft magnetic composite, magnetic resistance in the axial direction is smaller than the magnetic resistance in the axial direction of laminating rotor core 43a. Therefore, in the interior of compact rotor core 43b, the magnetic line easily passes through in the axial direction.

As shown in FIG. 2, a plurality of rotor teeth (first protruding polar units) 45 protruding towards the outside in the radial direction are formed in an outer surface of laminating rotor core 43a at equal intervals.

Magnet 44 is provided between adjacent rotor teeth 45. Outer surfaces of rotor teeth 45 and an outer surface of magnet 44 are both positioned on the virtual same circumference around a center axis line of rotation shaft 41. That is, magnet 44 is provided so as to be adjacent to rotor teeth 45 in the circumferential direction of rotor 40 and provided so that the outer surfaces do not have any difference.

An N pole (a first pole) and an S pole (a second pole) of magnet 44 are arranged so as to align in the radial direction of rotor 40. It should be noted that in the present embodiment, the N pole of magnet 44 is arranged towards the outside in the radial direction of rotor core 43 and the S pole of magnet 44 is arranged towards the inside in the radial direction of rotor core 43. However, the poles may be arranged conversely.

Stator 30 includes a stator core 22 formed in a hollow cylindrical shape, a plurality of stator teeth (second protruding polar units) 23 formed in an inner surface of stator core 22 and protruding towards the inside in the radial direction of stator core 22, and a coil 24 wound around stator teeth 23.

Stator teeth 23 are formed in the circumferential direction at equal intervals. A part of coil 24 forms a U phase coil, a remaining part of coil 24 forms a V phase coil and the other remaining part of coil 24 forms a W phase coil. One ends of the U phase coil, the V phase coil and the W phase coil serve as terminals and are connected to three phase cables (a U phase cable, a V phase cable and a W phase cable) of an inverter (not shown), respectively. Further, the other ends of the U phase coil, the V phase coil and the W phase coil are all together connected to one point serving as a neutral point.

When a controller 100 (FIG. 6) receives a torque command value from an ECU (Electronic Control Unit) provided in the exterior of the drive device of the electric motor, controller 100 controls an electric current (a motor drive current) passing through the phases of electric motor 10 so that torque specified by the received torque command value is outputted. The controlled motor drive current is supplied to coil 24 via the three phase cables.

Since stator core 22 is formed by laminating a plurality of magnetic steel plates, the air gap is generated between the magnetic steel plates. Therefore, magnetic resistance in the radial direction and the circumferential direction of stator core 22 is smaller than magnetic resistance in the axial direction. Thereby, the magnetic line coming into stator core 22 easily passes through in the circumferential direction and the radial direction of stator core 22 but does not easily pass through in the axial direction.

As shown in FIG. 1, field yoke 21 is provided with a top plate unit 21a arranged at a position away from both ends of stator 30 and rotor 40 in the axial direction, a cylindrical side wall unit 21b formed in a circumference part of this top plate unit 21a, and a cylindrical protruding unit 21c formed in top plate unit 21a.

A through hole 21d is formed in a center part of top plate unit 21a. Rotation shaft 41 is inserted into through hole 21d via a bearing 46. Side wall unit 21b is fixedly installed in an outer surface of stator core 22.

Field yoke 21 is made of the integral magnetic material, specifically made of the soft magnetic composites (SMC) serving as a three-dimensional perfect isotropic material. Therefore, magnetic resistance in the axial direction of field yoke 21 is smaller than the magnetic resistance in the axial direction of stator core 22.

Protruding unit 21c is formed in an inner surface of top plate unit 21a and protrudes towards an end of compact rotor core 43b in the axial direction. An end of protruding unit 21c and the end of compact rotor core 43b come close to each other to the extent that the magnetic line is not shut off between the end of protruding unit 21c and the end of compact rotor core 43b.

Therefore, it is possible to form a magnetic circuit (a first magnetic circuit) reaching from the N pole of magnet 44 to field yoke 21 via air gap GP and stator core 22, then passing through the interior of field yoke 21 in the axial direction, coming from protruding unit 21c into compact rotor core 43b, and then returning to the S pole of magnet 44.

In this magnetic circuit, the magnetic resistance in the radial direction of stator core 22 is suppressed to be small, the magnetic resistance in field yoke 21 is also suppressed to be small, and further the magnetic resistance of compact rotor core 43b is suppressed to be small. Therefore, it is possible to suppress loss of magnetic energy to be small.

It should be noted that although cylindrical protruding unit 21c is formed in field yoke 21 in an example shown in FIG. 1, protruding unit 21c may be provided in the end of compact rotor core 43b.

Field coil (winding) 50 is wound around an outer periphery surface of protruding unit 21c. Since the electric current passes through this field coil 50, it is possible to give a magnetic property of the N pole to the end side of protruding unit 21c for example and also give a magnetic property of the S pole to side wall unit 21b. Alternatively, it is possible to give the magnetic property of the S pole to the end side of protruding unit 21c and also give the magnetic property of the N pole to side wall unit 21b. It should be noted that although field coil 50 is provided in protruding unit 21c of field yoke 21 in the present embodiment, field coil 50 is not limited to this position but may be provided in anywhere in field yoke 21. Here, provision of field coil 50 in field yoke 21 is not limited to the case where field coil 50 is abutted to a surface of field yoke 21 but includes a case where field coil 50 is away from the surface of field yoke 21 when flow of the magnetic line in field yoke 21 can be controlled.

Figure 3:
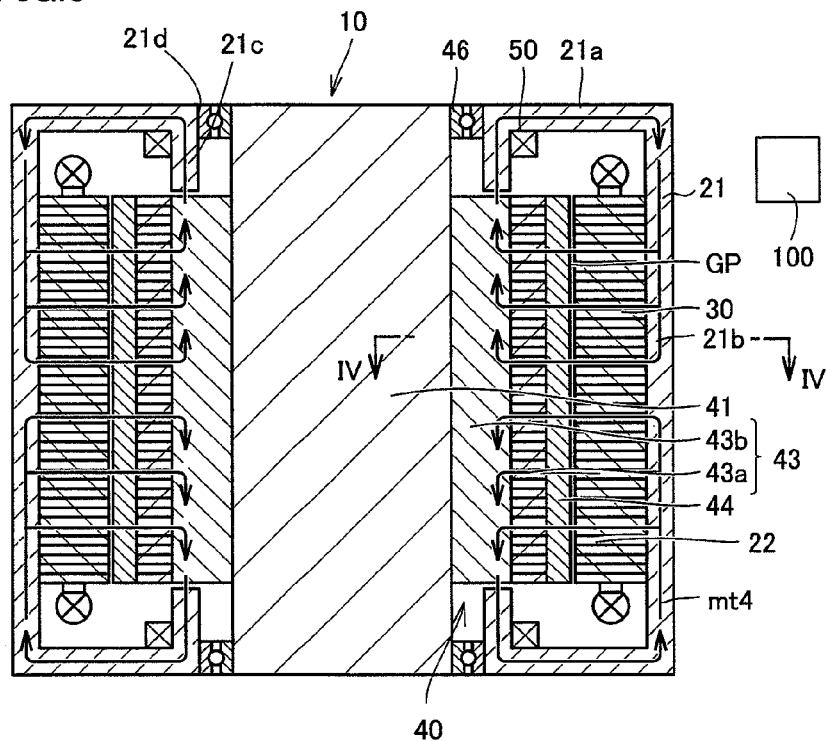
FIG. 3 is a sectional side view of the electric motor in a state that an electric current is supplied to a field coil shown in FIG. 1.
Figure 4:
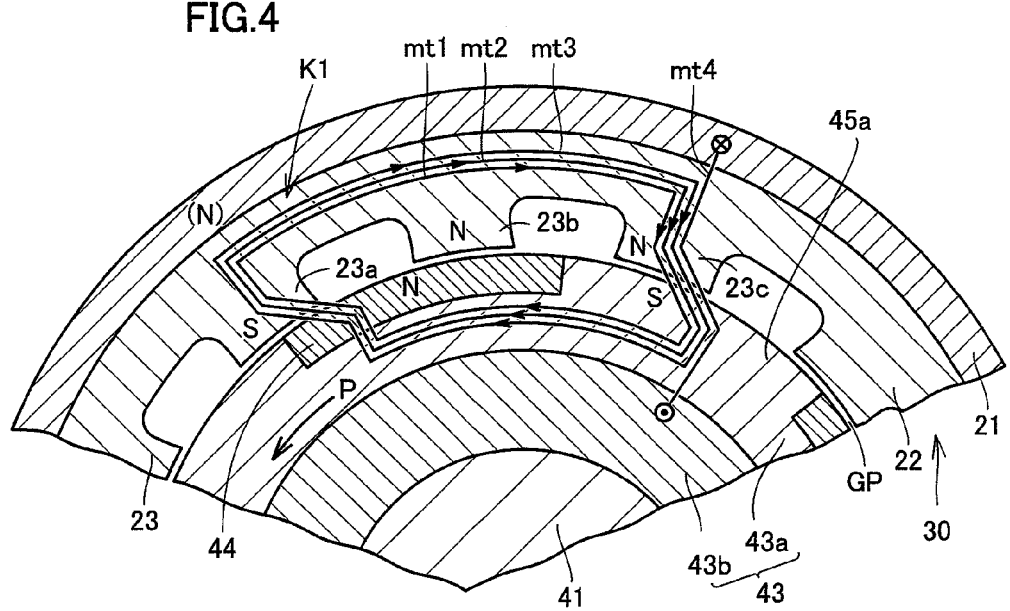
FIG. 4 is a sectional view taken along line Iv-TV of FIG. 3.

An operation of electric motor 10 configured as above will be described with using FIGS. 3 and 4. FIG. 3 is a sectional side view of electric motor 10 in a state that the electric current is supplied to field coil 50 shown in FIG. 1. FIG. 4 is a sectional view taken along line IV-IV of FIG. 3.

With reference to FIG. 3, since the electric current passes through field coil 50, a magnetic line mt4 is generated. This magnetic line mt4 passes through top plate unit 21a of field yoke 21 and comes from side wall unit 21b into stator core 22. Then magnetic line mt4 comes into rotor core 43 via air gap GP, and then proceeds in the axial direction in rotor core 43. After that, magnetic line mt4 comes from an end surface of rotor core 43 in the axial direction into field yoke 21 via an end surface of protruding unit 21c.

Since such a magnetic circuit is generated, protruding unit 21c of field yoke 21 is given the magnetic property of the S pole and side wall unit 21c of field yoke 21 is given the magnetic property of the N pole.

In FIG. 4, a stator tooth 23a is arranged on the end side of magnet 44 on the front side in the rotation direction P of rotor 40. A center part of an outer main surface of magnet 44 in the circumferential direction is positioned on the rear side in the rotation direction P relative to a center part of an end surface of stator tooth 23a in the circumferential direction. The end surface on the inner diameter side of this stator tooth 23a is the S pole.

Therefore, magnetic lines mt1 to mt4 running from the outer main surface of magnet 44 are inclined towards the front side in the rotation direction P gradually towards the outside in the radial direction and reach the end surface of stator tooth 23a. In such a way, a magnetic channel of magnetic lines mt1 to mt3 between magnet 44 and stator tooth 23a is inclined and elongated. Therefore, stress is added to rotor 40 so that the magnetic channel is the shortest. That is, magnet 44 is pulled towards stator tooth 23a.

A stator tooth 23b is provided on the rear side in the rotation direction P of rotor 40 relative to stator tooth 23a. This stator tooth 23b faces the vicinity of the center part of magnet 44. An end surface on the inner diameter side of stator tooth 23b is the N pole and repulsive against magnet 44.

Therefore, magnet lines mt1 to mt3 coming from stator tooth 23a into stator core 22 pass through in the circumferential direction in stator core 22. At this time, as mentioned above, since the electric current passes through field coil 50, an inner wall surface of side wall unit 21b is the N pole. Therefore, magnetic lines mt1 to mt3 from magnet 44 come from the end surface of stator tooth 23a into stator core 22 and then proceed along the circumferential direction of stator core 22. That is, after reaching stator tooth 23a, magnetic lines mt1 to mt3 are suppressed so as not to pass through in the radial direction in stator core 22 and reach field yoke 21.

A stator tooth 23c is provided on the rear side in the rotation direction P of rotor 40 relative to stator tooth 23b. An end surface on the inner diameter side of stator tooth 23c is the N pole. This stator tooth 23c faces a rotor tooth 45a.

Here, the outer surface of magnet 44 adjacent to rotor tooth 45a is the N pole. Therefore, magnetic lines mt1 to mt3 running from an end surface of stator tooth 23c towards rotor tooth 45a pass through towards rotor tooth 45a so as to be inclined towards the rear side in the rotation direction P by receiving an influence of the N pole of this magnet 44. Rotor tooth 45a is favorably pulled towards stator tooth 23c so that length of this channel is the shortest.

In such a way, a magnetic circuit K1 is formed so that magnetic lines mt1 to mt3 reach from magnet 44 to stator tooth 23a via air gap GP, pass through the interior of stator core 22 in the circumferential direction, reach from stator tooth 23c to the interior of laminating rotor core 43a via air gap GP and then return to magnet 44 again.

Meanwhile, in a state that the electric current is not supplied to field coil 50, a part of magnetic lines mt1 to mt3 from magnet 44 (such as magnetic line mt3) reaches to stator tooth 23a, and then passes through the interior of stator core 22 in the radial direction and reaches to field yoke 21. Then, a magnetic circuit K2 (not shown) is formed so that magnetic line mt3 passes through field yoke 21 in the axial direction, comes from protruding unit 21c into compact rotor core 43b and then returns to magnet 44 again.

That is, since the electric current passes through field coil 50, magnetic lines mt1 to mt3 generated from magnet 44 are suppressed so as not to pass through magnetic circuit K2 and magnetic lines mt1 to mt3 are controlled so as to pass through magnetic circuit K1. Thereby, it is possible to increase a ratio of content of magnetic flux passing through magnetic circuit K1 largely contributing to generation of torque relative to fixed content of magnetic flux generated from magnet 44. Therefore, it is possible to obtain large torque.

Further, as shown in FIG. 4, magnetic line mt4 generated by field coil 50 passes through a channel serving as a part of magnetic circuit K1 and reaching from stator tooth 23c to rotor tooth 45a and then reaches to compact rotor core 43b. Therefore, magnetic line mt4 also contributes to the generation of the torque.

Figure 5:
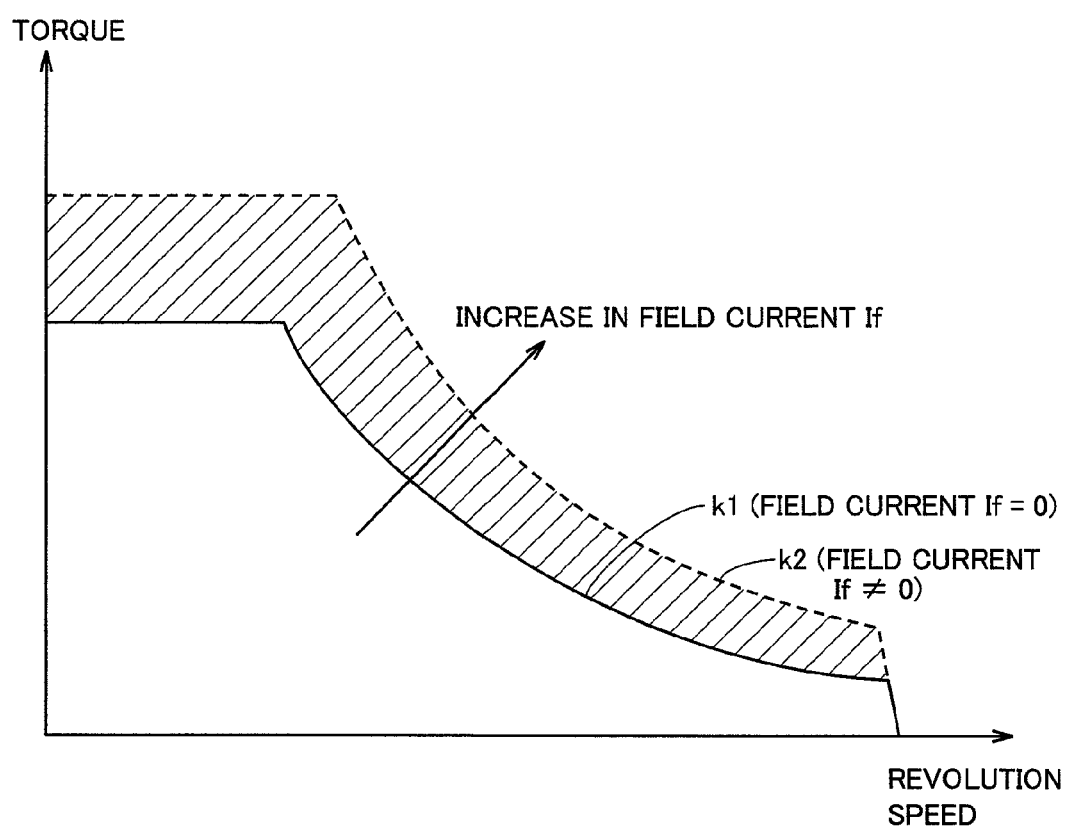
FIG. 5 is a view showing a relationship between torque and the revolution speed of the electric motor.

As mentioned above, since the electric current passes through field coil 50, "stronger field control" is performed on electric motor 10. FIG. 5 is a view showing a relationship between the torque and the revolution speed of electric motor 10. It should be noted that the electric current supplied to field coil 50 is also called as the "field current" and the field current is represented by using a symbol If below.

In FIG. 5, a curve k1 indicates an output characteristic of electric motor 10 in a state that the electric current is not supplied to field coil 50 (field current If=0). Meanwhile, a curve k2 indicates an output characteristic of the electric motor in a state that the electric current is supplied to field coil 50 (field current If≠0).

As shown in FIG. 5, since the electric current passes through field coil 50 and the stronger field control is performed on electric motor 10, it is found that the torque is large in a wide region from the low revolution speed to the high revolution speed. Particularly, large torque is obtained in a region where the revolution speed is low.

It should be noted that "weaker field control" can be performed on electric motor 10 by reversing a direction of the electric current passing through field coil 50. In this case, since the electric current passes through field coil 50, the ratio of the content of the magnetic flux passing through magnetic circuit K1 is decreased.

According to the present embodiment, the surface of magnet 44 among an outer periphery surface of rotor 40 functions as a region of generating the magnetic line, and rotor teeth 45 function as a region of taking in the generated magnetic line. Since magnet 44 and rotor teeth 45 are extended along the axial direction of rotor 40, the outer periphery surface of rotor 40 is formed by the surface of magnet 44 and surfaces of rotor teeth 45. Therefore, since the substantially entire surfaces of outer periphery surfaces of rotor teeth 45 can function as a region of outputting the magnetic line and the region of taking in the magnetic line, utilization efficiency of the outer periphery surface of rotor 40 can be improved. As a result, even when rotor 40 is small-sized, desired content of the magnetic flux can be outputted and taken in. Therefore, it is possible to form compact rotor 40.

[Configuration of Drive Device of Electric Motor]

As mentioned above, according to the present embodiment, the field control of electric motor 10 is performed by adjusting the content of the magnetic flux passing through magnetic circuit K1 and the content of the magnetic flux passing through magnetic circuit K2 by field current If passing through field coil 50 so as to adjust content of armature interlinkage magnetic flux.

However, in order to realize such field control, there is a need for newly installing a power circuit for supplying field current If to field coil 50. The installation of this power circuit leads to problems of increasing size of the drive device of the electric motor and device cost.

Therefore, in the drive device of the electric motor according to the present embodiment, a reactor serving as a constituent element of an electrical power conversion device for converting voltage from a power source into drive voltage of electric motor 10 is also used as field coil 50 as described later.

Figure 6:
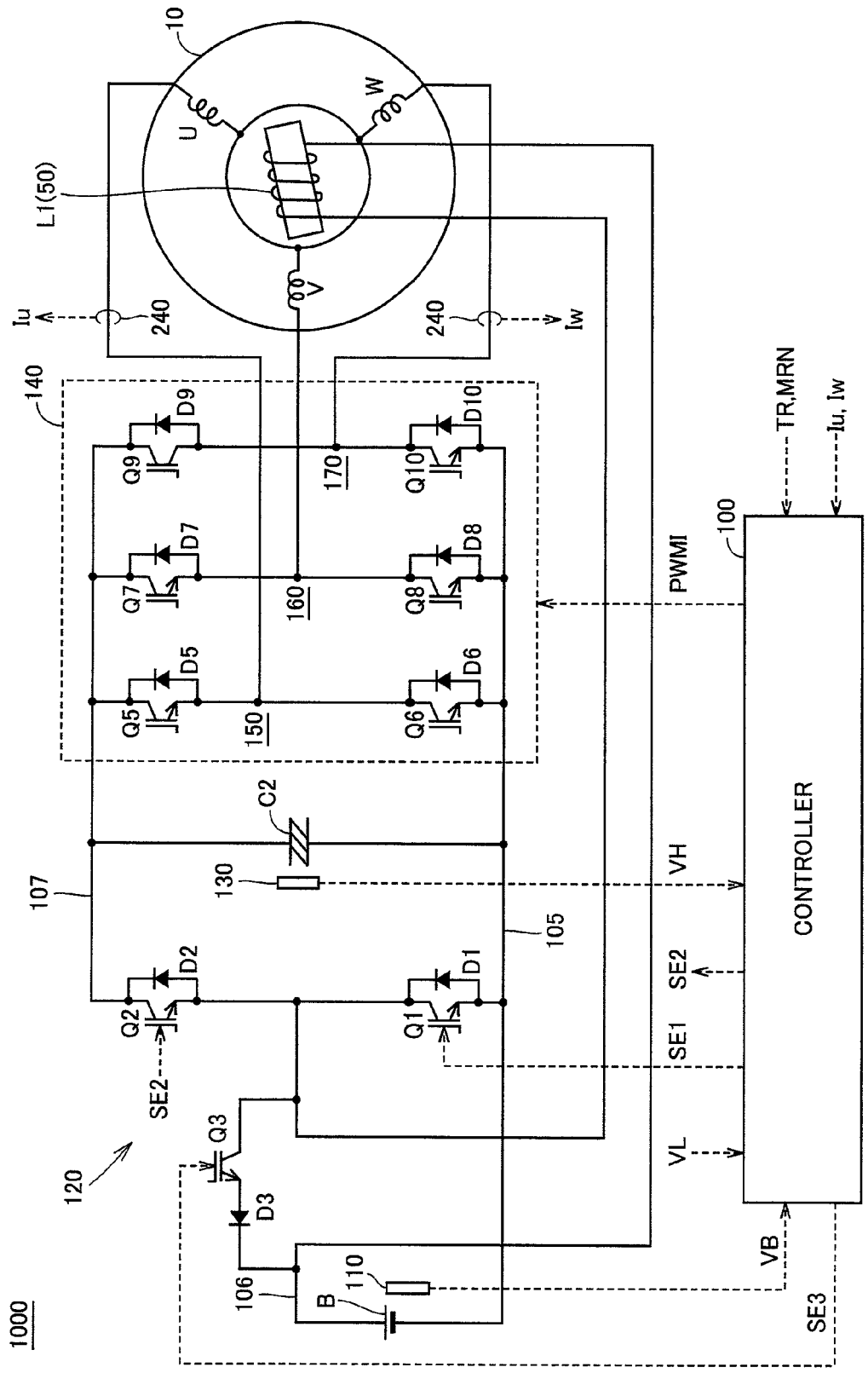
FIG. 6 is a schematic block diagram of the drive device of the electric motor according to the embodiment of this invention.

FIG. 6 is a schematic block diagram of the drive device of the electric motor according to the embodiment of the present invention.

With reference to FIG. 6, a drive device 1000 of the electric motor is provided with a battery B, a voltage boosting converter 120, an inverter 140, a capacitor C2, voltage sensors 110 and 130, and a current sensor 240.

Electric motor 10 is formed as shown in FIGS. 1 and 2. That is, electric motor 10 is provided with the rotor fixedly installed in the rotation shaft, the filed yoke provided in the outer periphery of the stator, and field coil 50.

In the present embodiment, electric motor 10 is a drive motor for generating the torque for driving drive wheels of a hybrid vehicle or an electric vehicle. Electric motor 10 is a motor capable of functioning as a power generator driven by an engine and acting as an electric motor relative to the engine such as starting up the engine.

Battery B is made of a nickel hydride secondary battery, a lithium ion secondary battery or the like. It should be noted that although a configuration that battery B made of the secondary battery is the "DC power source" will be described in the present embodiment, a power storage device such as an electric double layer capacitor can be applied instead of battery B. Voltage sensor 110 detects DC voltage VB outputted from battery B and outputs detected DC voltage VB to controller 100.

Voltage boosting converter 120 includes a reactor L1, and power semiconductor switching elements (hereinafter, also simply referred to as the "switching elements") Q1 and Q2 where switching control is performed.

One end of reactor L1 is connected to a power source line 106 of battery B, and the other end is connected to a connection node between switching element Q1 and switching element Q2. It should be noted that in the present embodiment, reactor L1 is wound around field yoke 21 (FIG. 1) of electric motor 10. That is, the voltage switched by switching elements Q1 and Q2 is applied to reactor L1 and reactor L1 forms field coil 50 in electric motor 10.

Switching elements Q1 and Q2 are connected in series between a power source line 107 and a grounding line 105. ON/OFF of switching elements Q1 and Q2 is controlled by switching control signals SE1 and SE2 from controller 100.

In the embodiment of this invention, an IGBT (Insulated Gate Bipolar Transistor), a power MOS (Metal Oxide Semiconductor) transistor, a power bipolar transistor or the like can be used as the switching element. Antiparallel diodes D1 and D2 are arranged to switching elements Q1 and Q2.

Smoothing capacitor C2 is connected between power source line 107 and grounding line 105. Voltage sensor 130 detects voltage VH (corresponding to boosted voltage of voltage boosting converter 120) on both ends of smoothing capacitor C2, and outputs detected voltage VH to controller 100.

The DC voltage side of inverter 140 is connected to voltage boosting converter 120 via power source line 107 and grounding line 105.

Inverter 140 is formed by a U phase arm 150, a V phase arm 160, and a W phase arm 170 provided in parallel between power source line 107 and grounding line 105. Each of the phase arms is made of switching elements connected in series between power source line 107 and grounding line 105. For example, U phase arm 150 is made of switching elements Q5 and Q6, V phase arm 160 is made of switching elements Q7 and Q8, and W phase arm 170 is made of switching elements Q9 and Q10. Antiparallel diodes D5 to D10 are connected to switching elements Q5 to Q10, respectively. ON/OFF of switching elements Q5 to Q10 is controlled by a switching control signal PWMI from controller 100.

Intermediate points of the phase arms are connected to phase ends of phase coils of electric motor 10. That is, electric motor 10 is a three-phase synchronous motor where one ends of three U, V and W phase coils are connected to a middle point of electric motor 10 together. The other end of the U phase coil is connected to the intermediate point between switching elements Q5 and Q6, the other end of the V phase coil is connected to the intermediate point between switching elements Q7 and Q8, and the other end of the W phase coil is connected to the intermediate point between switching elements Q9 and Q10. Inverter 140 bi-directionally converts the electric power between voltage boosting converter 120 and electric motor 10 by ON/OFF control (the switching control) of switching elements Q5 to Q10 responding to switching control signal PWMI from controller 100.

Specifically, inverter 140 can convert the DC voltage received from power source line 107 into three-phase AC voltage in accordance with the switching control by controller 100 and output the converted three-phase AC voltage to electric motor 10. Thereby, electric motor 10 is driven so as to generate specified torque.

Inverter 140 can also convert the three-phase AC voltage generated by electric motor 10 into the DC voltage in accordance with the switching control by controller 100 and output the converted DC voltage to power source line 107 at the time of regenerative brake of the hybrid vehicle or the electric vehicle where drive device 1000 of the electric motor is installed.

It should be noted that the regenerative brake here includes brake with regeneration in a case where a driver operating the hybrid vehicle or the electric vehicle operates a foot brake, and deceleration (or cancellation of acceleration) while regenerating since the driver does not operate the foot brake but turns an accelerator pedal OFF during driving.

Current sensor 240 is provided in electric motor 10. The sum of instantaneous values of three phase currents Iu, Iv and Iw is zero. Therefore, current sensor 240 is only arranged so as to detect two-phase motor currents (such as U phase current Iu and W phase current Iw) as shown in FIG. 6. Motor currents Iu and Iw detected by current sensor 240 are inputted to controller 100. Further, controller 100 receives inputs of a torque command value TR and the motor revolution speed MRN of electric motor 10 as motor commands.

In drive device 1000 of the electric motor configured as above, voltage boosting converter 120 is formed as a chopper type circuit including reactor L1 electrically connected onto an electric current channel formed between power source lines 106 and 107. The voltage switched by ON/OFF of switching elements Q1 and Q2 is applied to both ends of reactor L1.

Further, reactor L1 is wound around field yoke 21 of electric motor 10 so as to form field coil 50 (FIG. 1). Therefore, since the electric current passes through reactor L1, the field control of electric motor 10 as mentioned above is performed.

In such a way, since reactor L1 of voltage boosting converter 120 is also used as field coil 50 of electric motor 10, the electric current passing through between power source lines 106 and 107 is supplied to field coil 50. Therefore, there is no need for newly providing a power circuit for supplying the electric current to field coil 50. Consequently, it is possible to prevent an increase in the size of drive device 1000 of the electric motor and in device cost.

On the other hand, however, in the present configuration, when a voltage boosting operation is performed by voltage boosting converter 120, the electric current always passes through field coil 50. Therefore, the field control of electric motor 10 is necessarily performed. A degree of the field current at this time depends on a voltage boosting ratio in voltage boosting converter 120. Therefore, the field current does not always correspond to an electric current value required for adjusting the content of the armature interlinkage magnetic flux.

That is, when reactor L1 is also used as field coil 50, there is a problem that the field control of electric motor 10 and control of the voltage boosting operation (voltage boosting control) cannot be executed independently from each other. As a result, there is a possibility that electric motor 10 cannot be driven and controlled so as to follow a demand output to electric motor 10 properly changed in accordance with an operation state of the vehicle.

Therefore, as shown in FIG. 6, the drive device of the electric motor according to the present embodiment is further provided with a switching element Q3 and a diode D3 connected in parallel to reactor L1. In the present configuration, since switching element Q3 is turned ON, an electric current channel is formed so that a direct current passes through switching element Q3 and diode D3 in accordance with the electric power accumulated in reactor L1.

In the configuration of FIG. 6, switching element Q1 of voltage boosting converter 120 corresponds to the "voltage boosting switching element" in the present invention, and switching element Q3 corresponds to the "field switching element" in the present invention.

In the present embodiment, controller 100 executes the switching control of switching element Q3 together with the switching control of switching elements Q1 and Q2 at the time of a power running operation of electric motor 10 as described below. Thereby, the voltage boosting control in voltage boosting converter 120 and the field control of electric motor 10 can be executed independently from each other.

[Control Structure of Drive Device of Electric Motor]

Controller 100 formed by the electronic control unit (ECU) includes a microcomputer, a RAM (Random Access Memory), and a ROM (Read Only Memory) (all not shown). Controller 100 generates switching control signals SE1 and SE2 (voltage boosting converter 120) and PWMI (inverter 140) for the switching control of voltage boosting converter 120 and inverter 140 so that electric motor 10 operates in accordance with the motor commands inputted from the electronic control unit (ECU) at a higher position based on predetermined program processing. That is, controller 100 controls a power conversion operation by voltage boosting converter 120 and inverter 140.

Further, controller 100 generates a switching control signal SE3 for the switching control of switching element Q3 connected in parallel to reactor L1 so that field current If is supplied to field coil 50 of electric motor 10. That is, controller 100 executes the field control of electric motor 10.

In the present embodiment, controller 100 sets a target value (target voltage boosting current) Ib* of an output current (hereinafter, also referred to as a voltage boosting current) Ib of voltage boosting converter 120 in accordance with an operation state of electric motor 10 and also sets a target value (target field current) If of field current If. A duty ratio (an ON period ratio) between switching elements Q1 and Q3 is set based on target voltage boosting current Ib* and target field current If*. Hereinafter, a setting operation of the duty ratio between switching elements Q1 and Q3 will be described.

Figure 8:
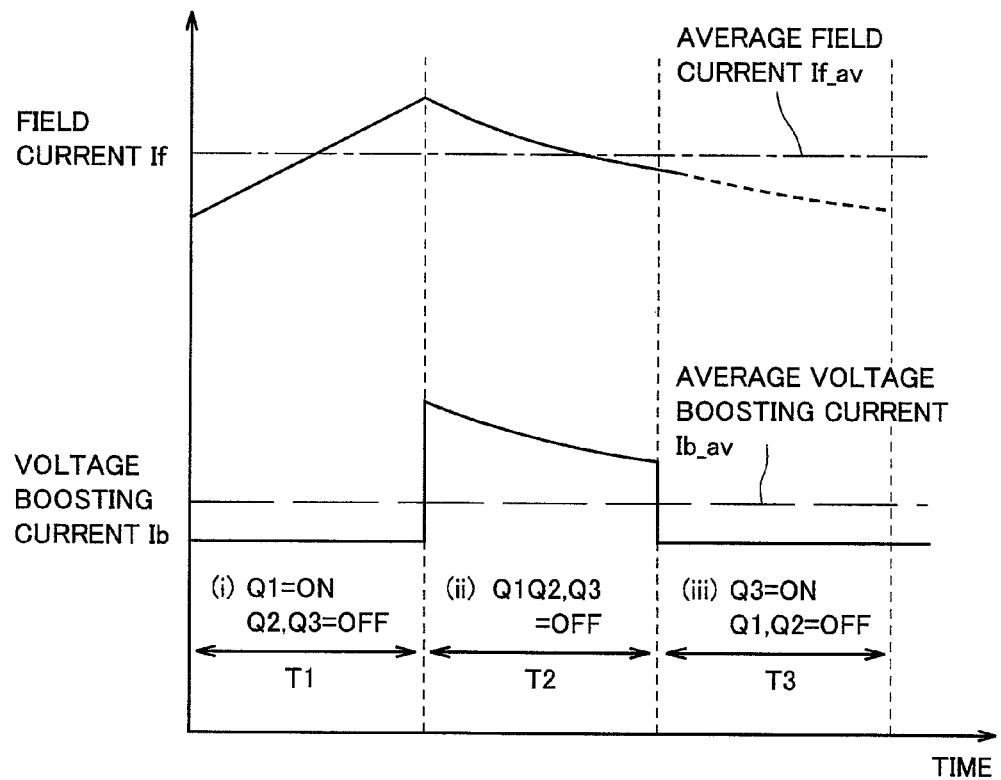
FIG. 8 is a timing chart of a field current If and a voltage boosting current Ib in one cycle of the switching control.

FIG. 7 is a view for illustrating the switching control of switching elements Q1 to Q3 by controller 100. The switching control is performed taking patterns (i) to (iii) in the figure as one cycle of the control. FIG. 8 is a timing chart of field current If and voltage boosting current Ib in one cycle of the switching control.

With reference to pattern (i) of FIG. 7, firstly, switching element Q1 is turned ON and switching elements Q2 and Q3 are turned OFF. Thereby, the direct current passes through a circuit formed by battery B, reactor L1 and switching element Q1 in the direction from battery B to switching element Q1 as shown by an arrow in the figure. In this time period, the electric power is accumulated in reactor L1. Therefore, as shown in FIG. 8, electric current (field current) If passing through reactor L1 is increased in the above time period (corresponding to a time period T1).

Next, as shown in pattern (ii), all switching elements Q1 to Q3 are turned OFF by turning switching element Q1 OFF. Then, in accordance with the electric power accumulated in reactor L1, direct current (voltage boosting current) Ib passes through from reactor L1 to capacitor C2 via diode D2.

In this case, as shown in a time period T2 of FIG. 8, voltage boosting current Ib passing through diode D2 is gradually decreased. Therefore, field current If passing through reactor L1 is also gradually decreased.

Finally, with reference to pattern (iii), when switching element Q3 is turned ON and switching elements Q1 and Q2 are turned OFF, the direct current passes through a circuit formed by reactor L1, switching element Q3 and diode D3 in the direction from reactor L1 to switching element Q3. In this case, as shown in a time period T3 of FIG. 8, field current If passing through reactor L1 is gradually decreased in accordance with a decrease in the remaining electric power accumulated in reactor L1. Diode D2 is not electrified and voltage boosting current Ib is decreased to 0 A.

It should be noted that at this time, when electric potential of capacitor C2 is lowered by supplying the electric power accumulated in capacitor C2 to inverter 140, voltage boosting current Ib shown by a dotted arrow in the figure passes through from reactor L1 to capacitor C2 via diode D2 so as to supplement the lowered electric potential.

Voltage boosting converter 120 performs the voltage boosting operation by repeating such patterns (i) to (iii). An electric current (an average voltage boosting current Ib_av) serving as an average of voltage boosting current Ib from time period T1 to time period T3 is outputted from voltage boosting converter 120. That is, average voltage boosting current Ib_av is an value determined by dividing voltage boosting current Ib in time period T2 by one control cycle (=time period T1+time period T2+time period T3).

Further, an electric current (an average field current If_av) serving as an average of field current If from time period T1 to time period T3 passes through reactor L1. The field control of electric motor 10 is performed in accordance with this average field current If_av.

That is, average voltage boosting current Ib_av and average field current If_av can be set independently from each other by changing a ratio of time period T1, time period T2 and time period T3 in one control cycle. Therefore, the above ratio is set so that a set voltage boosting current target value Ib* and a set field current target value If respectively correspond to average voltage boosting current Ib_av and average field current If_av. Thereby, it is possible to control the voltage boosting control and the field control of electric motor 10 independently from each other.

As mentioned above, according to the present embodiment, since the duty ratio between switching element Q1 of voltage boosting converter 120 and switching element Q3 connected in parallel to reactor L1 is controlled, it is possible to set voltage boosting current Ib outputted from voltage boosting converter 120 and field current If supplied to field coil 50 independently from each other.

According to the above, when reactor L1 of voltage boosting converter 120 is also used as the field coil of electric motor 10, it is possible to execute the voltage boosting control and the field control of electric motor 10 independently from each other in accordance with the demand output to electric motor 10. Thereby, large torque can be obtained by the stronger field control in a low revolution speed region, and high efficiency is realized by the voltage boosting control in a high revolution speed region. As a result, it is possible to realize higher output of electric motor 10 while suppressing an increase in the size of drive device 1000 of the electric motor and cost.

[Application Example of Drive Device of Electric Motor]

Hereinafter, a control method of an electrical vehicle provided with drive device 1000 of the electric motor according to the present embodiment will be described.

The demand torque (the torque×the revolution speed) to electric motor 10 is properly changed in accordance with an operation state of the electrical vehicle provided with drive device 1000 of the electric motor. Therefore, drive device 1000 of the electric motor is required to properly execute optimal drive control of electric motor 10 in accordance with the demand output.

Figure 9:
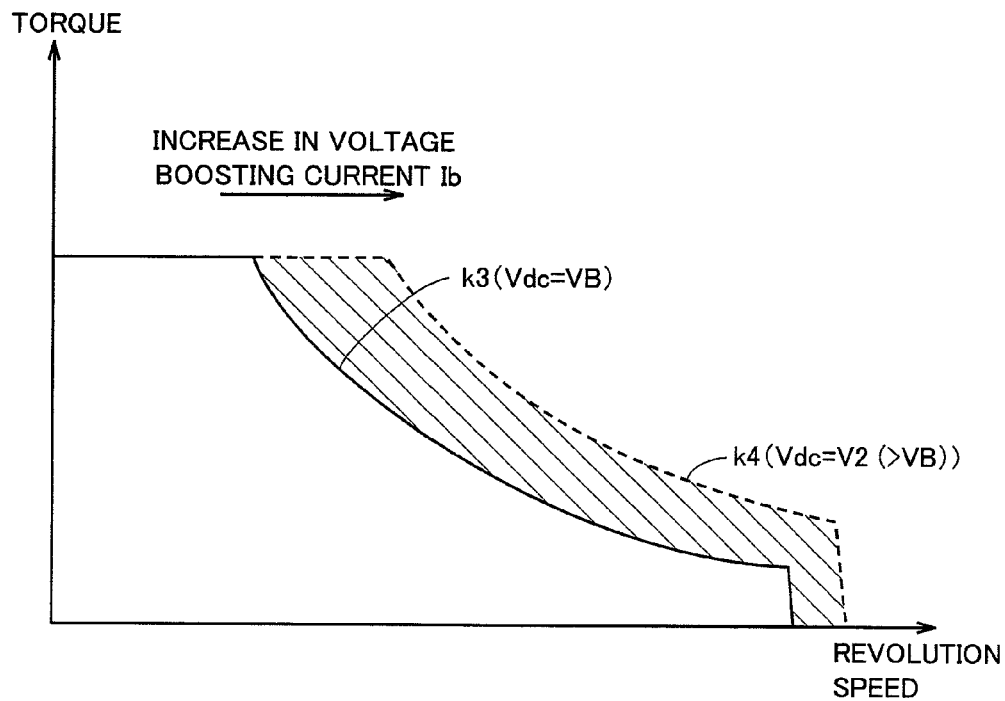
FIG. 9 is a view showing a relationship between the torque and the revolution speed of the electric motor.

FIG. 9 is a view showing a relationship between the torque and the revolution speed of electric motor 10.

In FIG. 9, a curve k3 indicates the relationship between the torque and the revolution speed of electric motor 10 in a case where boosted voltage VH (corresponding to DC side voltage of inverter 140, hereinafter this DC voltage is also referred to as a "system voltage") is equal to DC voltage VB from battery B. Meanwhile, a curve k4 indicates the relationship between the torque and the revolution speed of electric motor 10 in a case where system voltage VH is larger than DC voltage VB (VH=V2(>VB)).

As shown in FIG. 9, since system voltage VH is higher, that is since voltage boosting current Ib is increased, it is found that the torque in the high revolution speed region is increased. This is because since system voltage VH is variably controlled so as to be substantially the same as induced voltage of electric motor 10 in accordance with the operation state of electric motor 10, power loss generated in drive device 1000 of the electric motor can be minimum.

Figure 10:
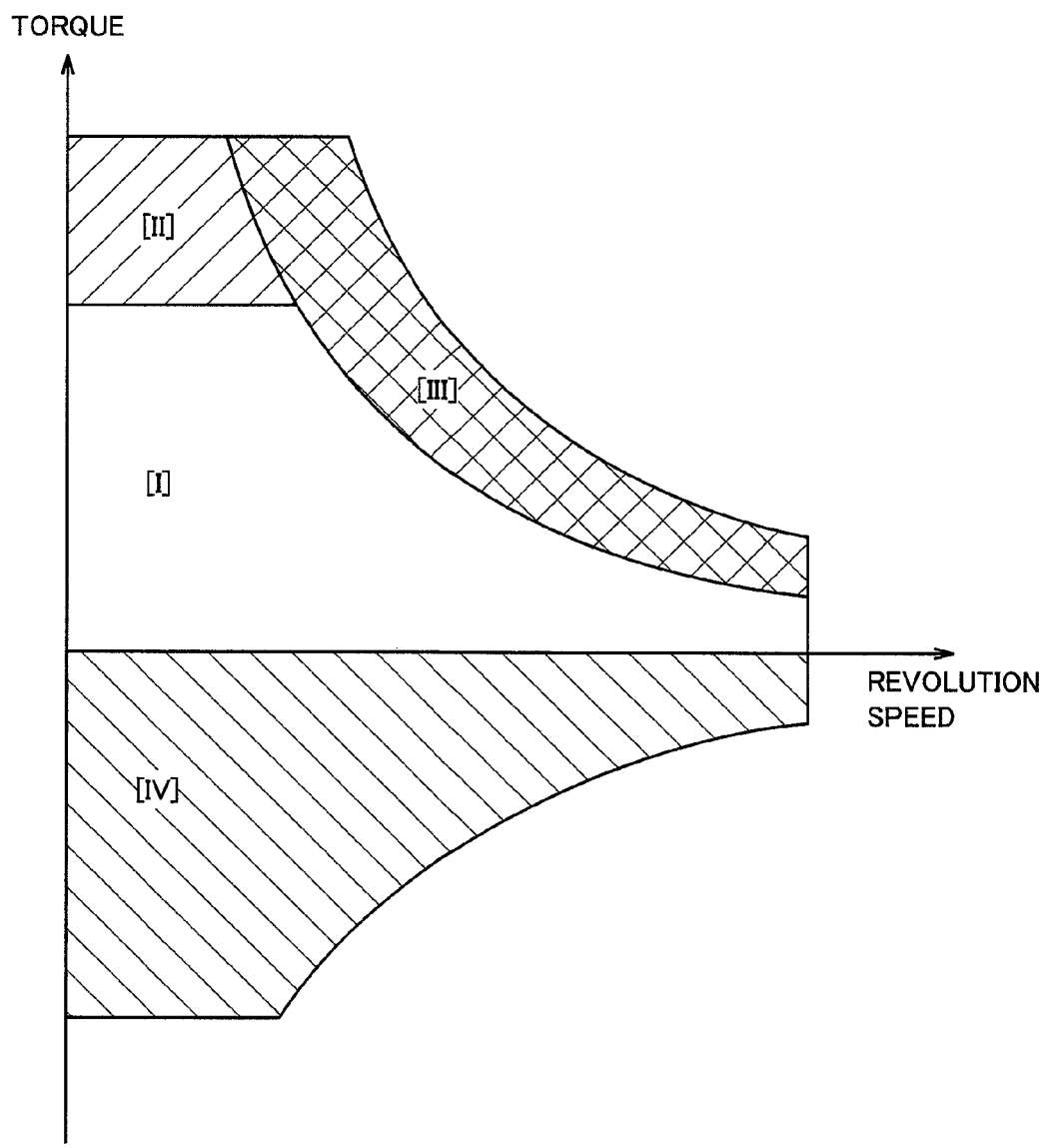
FIG. 10 is a view showing a relationship between the torque and the revolution speed of the electric motor when field control and voltage boosting control are performed.

Since this relationship between the torque and the revolution speed shown in FIG. 9 is overlapped with the relationship of FIG. 5, the relationship between the torque and the revolution speed of electric motor 10 can be classified as three operation regions [I] to [III] shown in FIG. 10.

Specifically, the operation region [I] of FIG. 10 is a region where the torque of electric motor 10 is relatively reduced in a region from the low revolution speed to the high revolution speed. Therefore, in a case where the demand output (the torque×the revolution speed) to electric motor 10 belongs to operation region [I], neither the voltage boosting control nor the field control of electric motor 10 is performed and an output of electric motor 10 can correspond to the demand output. That is, operation region [I] is a region where there is no need for the voltage boosting control and the field control.

Meanwhile, operation region [II] of FIG. 10 is a region where the revolution speed is low and the torque is relatively increased. Therefore, in a case where the demand output to electric motor 10 belongs to operation region [II], large torque in accordance with the demand output can be outputted from electric motor 10 by performing the stronger field control on electric motor 10 as mentioned above. That is, operation region [II] is a region where there is need for the field control but no need for the voltage boosting control.

Further, operation region [III] of FIG. 10 is a region where the torque is relatively increased to the high revolution speed. In a case where the demand output to electric motor 10 belongs to operation region [III], both the voltage boosting control and the field control of electric motor 10 are performed so that the output of electric motor 10 can correspond to the demand output. That is, operation region [III] is a region where there is need for both the voltage boosting control and the field control.

It should be noted that operation regions [I] to [III] mentioned above match with a mode of supplying the electric power from battery B to electric motor 10 so as to drive electric motor 10, that is, the "power running mode". Meanwhile, an operation region [IV] in the figure matches with a mode of regenerating the electric power from electric motor 10 to battery B, that is, the "regenerative mode".

In drive device 1000 of the electric motor according to the present embodiment, the demand output (the torque×the revolution speed) of electric motor 10 is calculated based on drive force demanded for the vehicle, and an optimal control mode where electric motor 10 outputs the calculated demand output is set based on the relationship between the torque and the revolution speed shown in FIG. 10.

In detail, the electronic control unit (ECU) at a higher position of controller 100 calculates the drive force demanded for the vehicle from an accelerator pedal position opened by an accelerator operation by the driver, and calculates the demand output (the torque×the revolution speed) of electric motor 10 based on the calculated demand drive force.

Next, controller 100 preliminarily stores the relationship between the torque and the revolution speed of FIG. 10 as a map. When the demand output of electric motor 10 is received from the electronic control unit at a higher position, controller 100 refers to the above map so as to set the optimal control mode based on a type of the operation region where the calculated demand output of electric motor 10 belongs to.

FIG. 11 is a view for illustrating a relationship between the operation region where the demand output of electric motor 10 belongs to and the optimal control mode.

With reference to FIG. 11, when the demand output of electric motor 10 belongs to operation region [I] of FIG. 10, a control mode of not executing the voltage boosting control and the field control is set.

Meanwhile, when the demand output of electric motor 10 belongs to operation region [II] of FIG. 10, a control mode of not executing the voltage boosting control and executing the field control is set.

When the demand output of electric motor 10 belongs to operation region [III] of FIG. 10, a control mode of executing the voltage boosting control and the field control is set.

It should be noted that when the demand output of electric motor 10 belongs to operation region [IV] of FIG. 10, that is, when the demand output of electric motor 10 belongs to the "regenerative mode", unlike the "power running mode" mentioned above, the switching control is performed on switching element Q2 so that voltage boosting converter 120 performs a voltage step-down operation and switching element Q3 is turned OFF and fixed.

In this case, since field current If passes through reactor L1 in the opposite direction (the direction towards battery B) to the time of the voltage boosting operation, the weaker field control is performed in electric motor 10. However, unlike the "power running mode", there is no problem of lack in the output of electric motor 10.

When the control mode is set in accordance with the relationship shown in FIG. 11, the switching control of switching elements Q1 to Q3 is performed based on the set control mode.

In detail, in the control mode of not executing the voltage boosting control and executing the field control among FIG. 11, patterns (i) to (iii) are repeatedly performed as one cycle of the control by the method described in FIG. 7.

In this case, the duty ratio between switching element Q1 and switching element Q3 is set so that target field current If set based on the demand output of electric motor 10 corresponds to average field current If_av.

Switching control signals SE1 to SE3 are generated so as to provide a time period when only switching element Q1 is turned ON, a time period when all switching elements Q1 to Q3 are turned OFF and a time period when only switching element Q3 is turned ON in accordance with the duty ratio.

It should be noted that since target voltage boosting current Ib* is small in the above control mode, the time period when all switching elements Q1 to Q3 are turned OFF in one control cycle is shorter than the time period when switching element Q1 or Q3 is turned ON.

In the control mode of executing the voltage boosting control and the field control, patterns (i) to (iii) are repeatedly performed as one cycle of the control by the method described in FIG. 7.

In this case, the duty ratio between switching element Q1 and switching element Q3 is set so that target voltage boosting current Ib* and target field current If both set based on the demand output of electric motor 10 respectively correspond to average voltage boosting current Ib_av and average field current If_av.

Switching control signals SE1 to SE3 are generated so as to provide the time period when only switching element Q1 is turned ON, the time period when all switching elements Q1 to Q3 are turned OFF and the time period when only switching element Q3 is turned ON in accordance with the duty ratio.

Further, with regard to the control mode of not executing the voltage boosting control and the field control in FIG. 11, when only switching element Q3 is added as shown in FIG. 6, field current If always passes through reactor L1. Therefore, there is a need for performing torque control by adjusting a degree of a motor armature current. In this case, there is a problem of power loss generated in reactor L1 by field current If.

As shown in FIG. 12, such a problem can be solved by newly providing a switching element Q4 for directly connecting a cathode of battery B and power source line 107 without voltage boosting converter 120.

FIG. 12 is a view for illustrating the switching control of switching element Q4 by controller 100. In the above switching control, since controller 100 generates a switching control signal SE4, a pattern (iv) in the figure is continuously performed over one cycle of the control.

With reference to pattern (iv), switching element Q4 is turned ON and switching elements Q1 to Q3 are turned OFF. Thereby, the direct current passes through in the direction from battery B to the power source line via switching element Q4 as shown by an arrow in the figure. Therefore, field current If passing through reactor L1 is 0 A.

In this case, since the electric current is not supplied to reactor L1, neither the voltage boosting control nor the field control is performed. The power loss generated in reactor L1 is suppressed to be substantially zero. That is, since switching element Q4 is provided, the power loss due to reactor L1 can be reduced. As a result, since energy efficiency of drive device 1000 of the electric motor can be enhanced, it is possible to improve fuel consumption of the electrical vehicle.

It should be noted that in the configuration of FIG. 12, switching element Q4 matches with the "bypass switching element" in the present invention.

Figure 13:
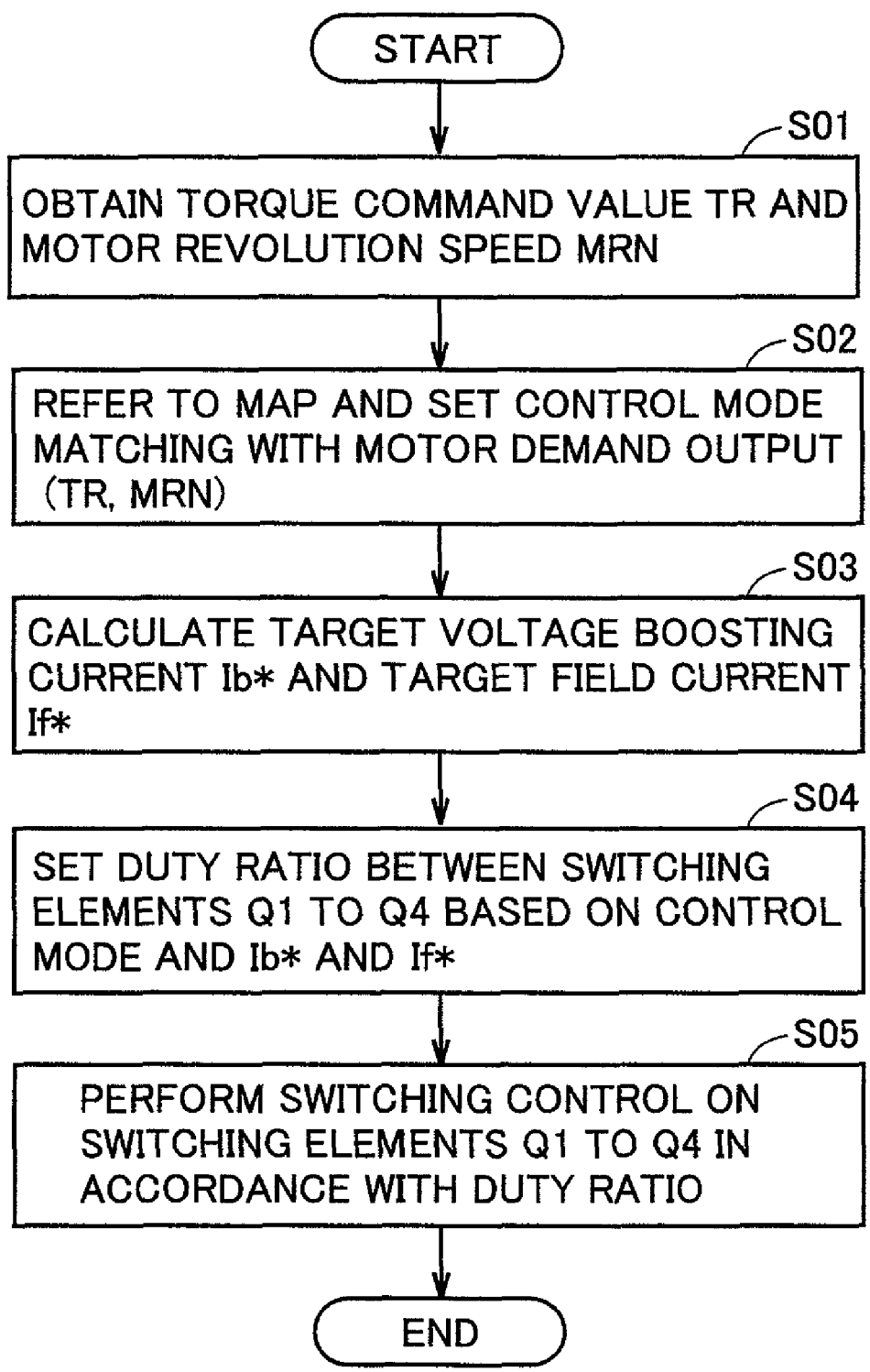
FIG. 13 is a flowchart for illustrating drive control of the electric motor by the controller.

FIG. 13 is a flowchart for illustrating the drive control of electric motor 10 by controller 100.

With reference to FIG. 13, controller 100 obtains torque command value TR and motor revolution speed MRN as the demand output to electric motor 10 (Step S01). These torque command value TR and motor revolution speed MRN are calculated by the electronic control unit (ECU) at a higher position of controller 100 based on the drive force demanded for the vehicle and calculated from the accelerator pedal position opened by the accelerator operation by the driver or the like.

Next, controller 100 preliminarily stores the relationship between the torque and the revolution speed of FIG. 10 as the map. Controller 100 refers to the map so as to set the optimal control mode based on the type of the operation region where torque command value TR and motor revolution speed MRN belong to (Step S02).

Further, controller 100 calculates target voltage boosting current Ib* and target field current If* based on torque command value TR and motor revolution speed MRN (Step S03). Controller 100 sets the duty ratio between switching elements Q1 to Q4 based on the control mode set in Step S02 and target voltage boosting current Ib* and target field current If* (Step S04).

Finally, controller 100 generates switching control signals SE1 to SE4 for the switching control of switching elements Q1 to Q4 in accordance with the set duty ratio. That is, controller 100 performs the field control of electric motor 10 and also controls the voltage boosting operation by voltage boosting converter 120 (Step S05).

As mentioned above, in the electrical vehicle provided with the drive device of the electric motor according to the present embodiment, large torque is obtained in the low revolution speed region (that is, a low vehicle speed region) and the electric motor can be driven with high efficiency in the high revolution speed region (that is, a high vehicle speed region). As a result, it is possible to reduce the size of the drive device and realize improvement in a running property of the vehicle due to higher output of the electric motor.

(Variation Example of Electric Motor 10)

Finally, variation examples of electric motor 10 applicable to the drive device of the electric motor according to the present embodiment will be described. It should be noted that the same configuration as the configuration shown in FIGS. 1 and 2 is given the same reference numerals and a description thereof will not be given.

In any electric motor according to the variation examples shown below, the reactor of the voltage boosting converter is also used as the field coil. Since the duty ratio between switching elements Q1 to Q4 is controlled by the method mentioned above, it is possible to perform the field control of the electric motor and the voltage boosting control independently from each other.

Variation Example 1

Figure 14:
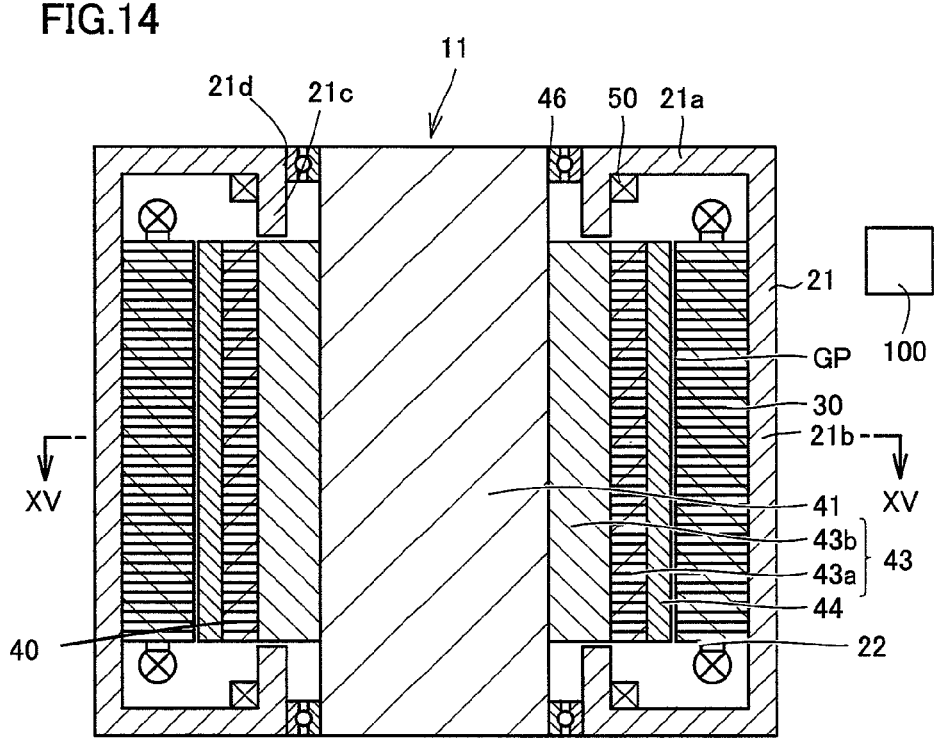
FIG. 14 is a sectional side view of an electric motor according to a variation example 1 of the embodiment of this invention.
Figure 15:
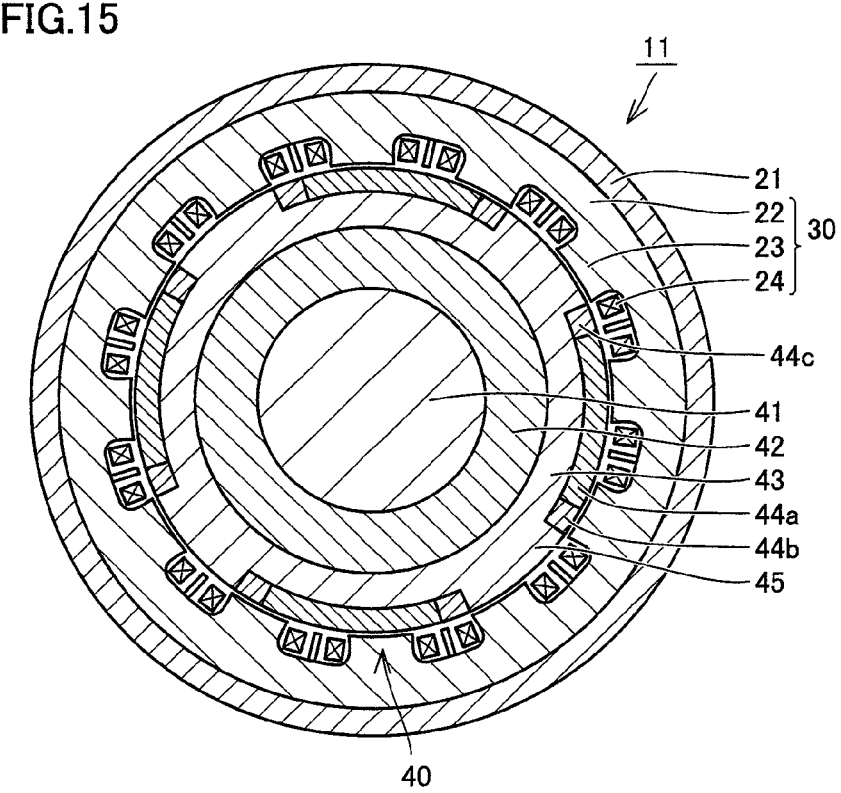
FIG. 15 is a sectional view taken along line XV-XV of FIG. 14.

FIG. 14 is a sectional side view of an electric motor 11 according to a variation example 1 of the embodiment of this invention. FIG. 15 is a sectional view taken along line XV-XV of FIG. 14.

As shown in FIG. 15, magnet 44 is provided with a magnet (a first magnet) 44a, and magnets (second magnets) 44b and 44c provided at positions adjacent to this magnet 44a. Magnets 44b and 44c are provided in both ends of magnet 44a.

A pole of magnet 44a positioned on the outer surface side of rotor core 43 is arranged so as to be different from poles of magnets 44b and 44c positioned on the outer surface side of rotor core 43. In such a way, since magnets 44b and 44c are provided, magnetic flux of magnets 44b and 44c is added to magnetic flux of magnet 44a so that the total content of the magnetic flux of magnet 44 is larger than content of the magnetic flux of only magnet 44a. Magnets 44a, 44b and 44c are extended over both ends of rotor 40. Therefore, it is possible to obtain the same action and effect as electric motor 10 mentioned above. Further, magnetic flux serving as the sum of the magnetic flux from magnet 44a, the magnetic flux from magnet 44b and the magnetic flux from magnet 44c passes through from an outer surface of magnet 44a. Therefore, it is possible to increase torque to be obtained in comparison to the case where magnet 44 is formed only by magnet 44a.

Since magnets 44b and 44c strongly attract the magnetic line from stator 30 towards rotor 40, it is possible to suppress a spread of a channel of the magnetic line from stator 30 towards rotor 40 by magnetic flux of coil 24 shown in FIG. 15.

Variation Example 2

Figure 16:
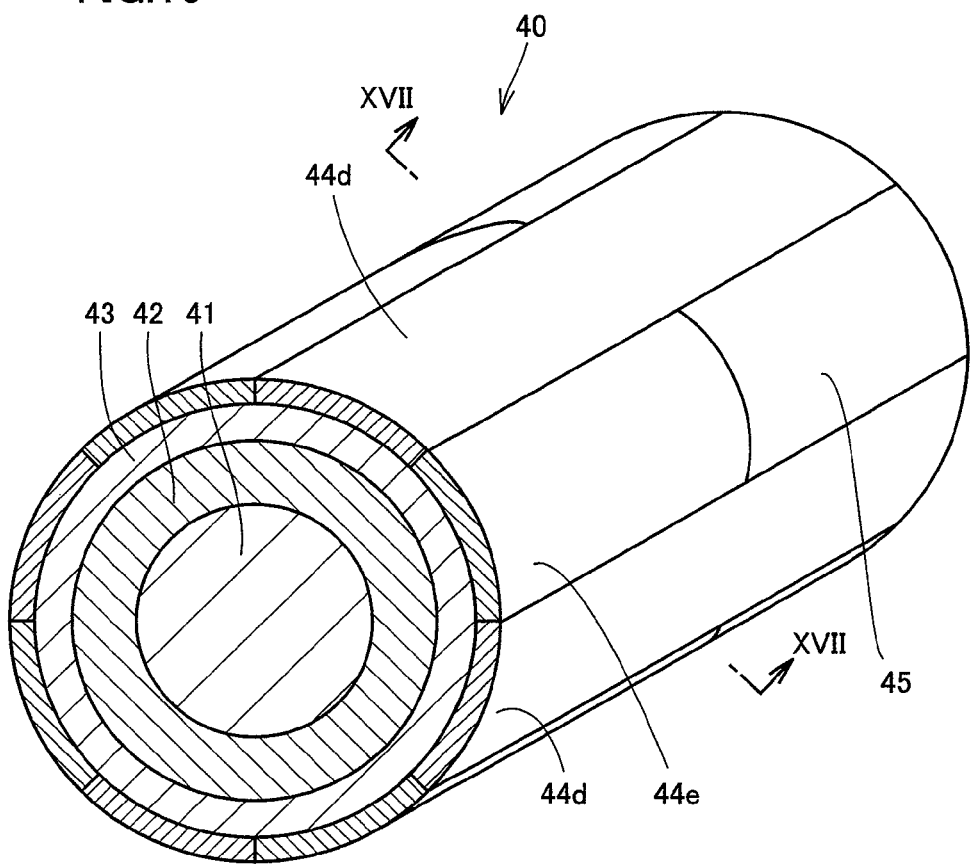
FIG. 16 is a perspective view of a rotor of an electric motor according to a variation example 2 of the embodiment of this invention.

FIG. 16 is a perspective view of rotor 40 of an electric motor according to a variation example 2 of the embodiment of this invention.

With reference to FIG. 16, magnets 44d and 44e are provided in an outer surface of rotor 40.

A surface of magnet 44d towards the outside is the N pole. A surface facing this surface is the S pole. That is, the N pole and the S pole of magnet 44d are aligned in the radial direction. This magnet 44d is extended from one end of rotor 40 to the other end.

Length of magnet 44e in the axial direction is shorter than length of magnet 44d in the axial direction. Magnet 44e is extended from one end of rotor 40 to a center part of rotor 40 in the axial direction. Magnet 44e is provided so as to cover a part of the outer surface of rotor 40 positioned between magnets 44d.

A surface of magnet 44e towards the outside is the S pole and the pole of different magnetic property from magnet 44d is towards the outside.

Therefore, a magnetic circuit passing through magnet 44e, magnet 44d formed at a position adjacent to this magnet 44e, and the stator (not shown) is formed. Magnetic flux passing through this magnetic circuit includes magnetic flux from magnet 44e and magnetic flux from magnet 44d. Since large content of the magnetic flux passes through, it is possible to obtain large torque.

Rotor tooth 45 is formed on the outer surface of rotor 40 positioned between magnets 44d, that is, the outer surface of rotor 40 adjacent to magnet 44e in the axial direction.

Figure 17:
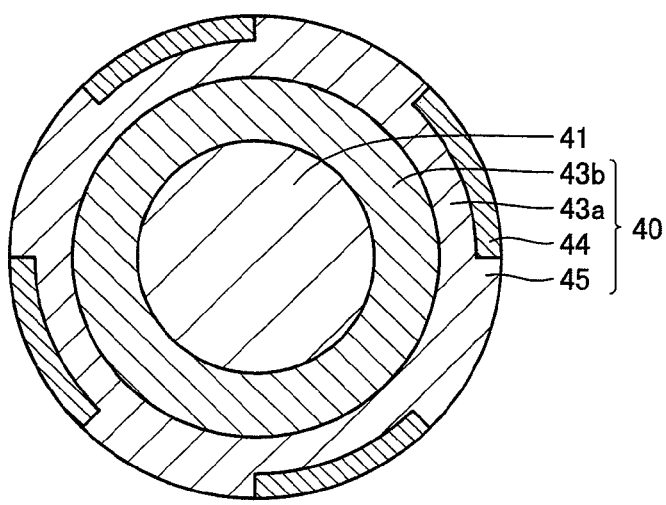
FIG. 17 is a sectional view taken along line XVII-XVII of FIG. 16.

FIG. 17 is a sectional view taken along line XVII-XVII of FIG. 16. As shown in FIG. 17, a part where rotor tooth 45 is positioned is the same configuration as electric motor 10 shown in FIGS. 1 and 2.

Therefore, in a region where rotor tooth 45 is formed, it is possible to obtain the same action and effect as electric motor 10 mentioned above.

Variation Example 3

Figure 18:
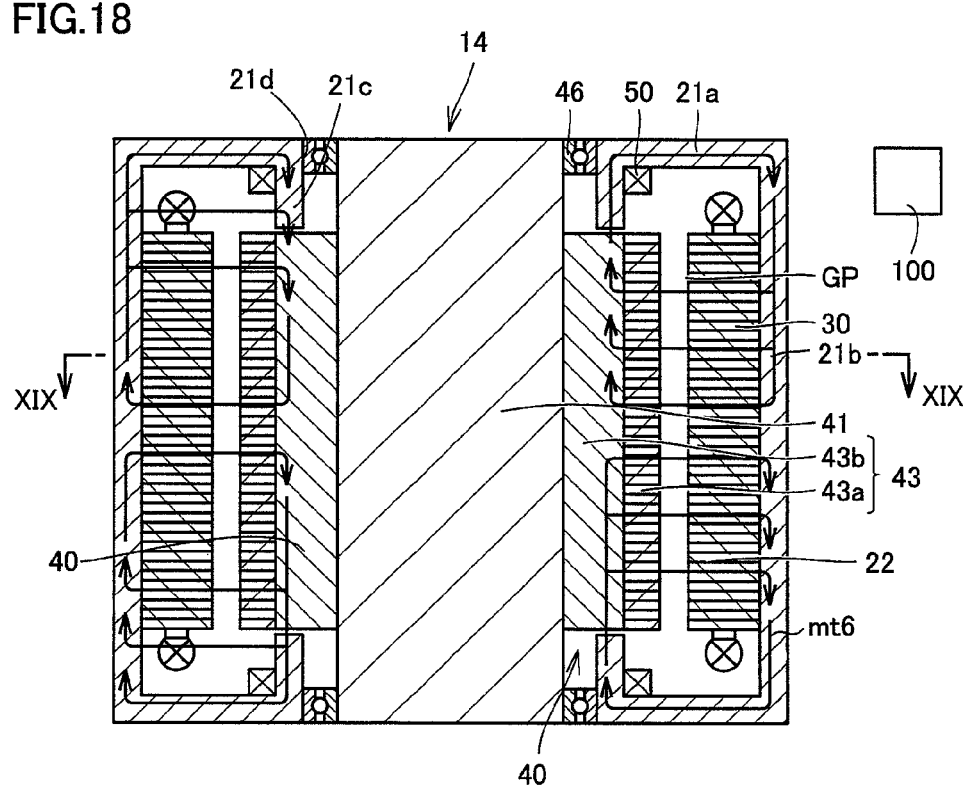
FIG. 18 is a sectional side view of an electric motor according to a variation example 3 of the embodiment of this invention.
Figure 19:
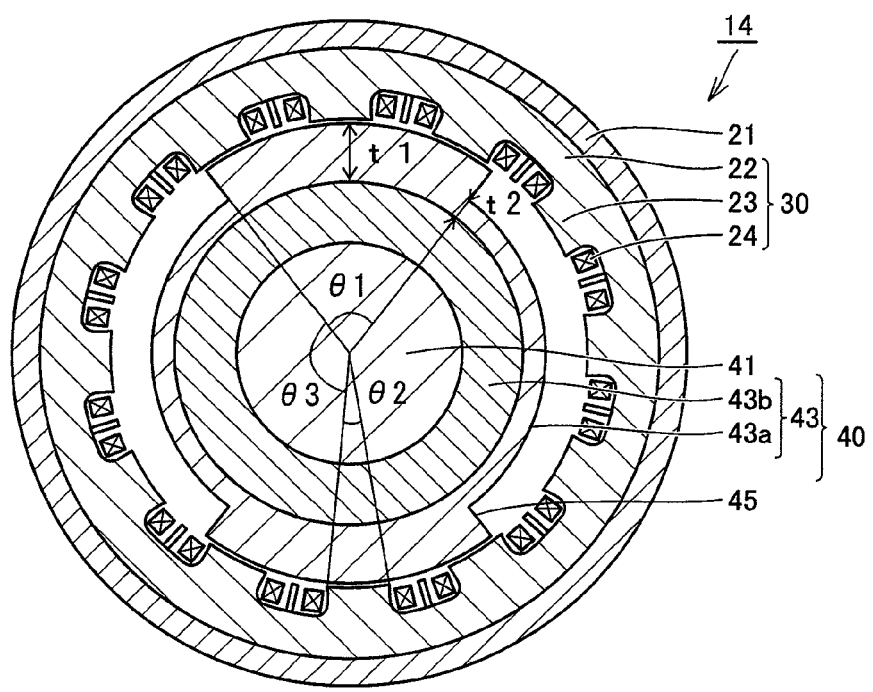
FIG. 19 is a sectional view taken along line XIX-XIX shown in FIG. 18.

FIG. 18 is a sectional side view of an electric motor 14 according to a variation example 3 of the embodiment of this invention. FIG. 19 is a sectional view taken along line XIX-XIX shown in FIG. 18.

With reference to FIG. 18, electric motor 14 is provided with rotation shaft 41, rotor 40 fixedly installed in rotation shaft 41, field yoke 21 provided in the outer periphery of stator 30, and field coil 50.

As shown in FIG. 19, rotor 40 is provided with two rotor teeth 45. Rotor teeth 45 are arranged so as to face each other.

Thickness t1 in the radial direction of compact rotor core 43b at parts where rotor teeth 45 are positioned is preferably not less than twice of thickness t2 in the radial direction of compact rotor core 43b at a part positioned between rotor teeth 45.

In such a way, since rotor teeth 45 protrudes in the radial direction, it is possible to suppress leakage of the magnetic flux from stator core 22 to a surface of rotor core 43 positioned between rotor core 4345. Thereby, since the armature interlinkage magnetic flux is increased, the torque can be increased.

It should be noted that a rotor tooth open angle θ1 is set so that when a center in the circumferential direction of rotor tooth 45 is adjusted to a center in the circumferential direction of stator tooth 23 in the radial direction, an end of rotor tooth 45 corresponds to an end of the other stator tooth 23 in the radial direction. For example, in a case where a stator tooth open angle θ2 is 15 degrees, rotor tooth open angle θ1 is approximately 75 degrees.

In general, when rotor tooth open angle θ1 is increased, a torque generation area is enlarged so that the torque is increased. However, in FIG. 19, when rotor tooth open angle θ1 is more than 75 degrees, a non-facing stator tooth 23 is positioned in the vicinity of the end in the circumferential direction of rotor tooth 45. The magnetic flux is leaked to stator tooth 23 and the torque is reduced.

Stator tooth open angle θ2 is set from a relationship between the torque generation area and magnetic saturation in stator core 22 and in field yoke 21. When stator tooth open angle θ2 is increased, the torque generation area is enlarged and the armature interlinkage magnetic flux is increased. Meanwhile, the torque is reduced due to the magnetic saturation in field yoke 21.

An operation of electric motor 14 configured as above will be described. In FIG. 18, since the electric current is supplied to field coil 50, a magnetic line mt6 of coming from protruding unit 21c of field yoke 21 into compact rotor core 43b, coming from rotor teeth 45 of laminating rotor core 43a into stator core 22, reaching to field yoke 21 and then returning to protruding unit 21c again is generated.

In FIG. 19, since magnetic line mt6 reaching from rotor teeth 45 to stator core 22, surfaces of rotor teeth 45 have the magnetic property of the N pole. Therefore, electric motor 14 according to variation example 3 also operates the same as a general permanent magnet synchronous motor.

Since a current amount to be supplied to field coil 50 is adjusted, the content of the magnetic flux to be generated can be adjusted. Thereby, it is possible to perform the "stronger field control" and the "weaker field control".

Variation Example 4

Figure 20:
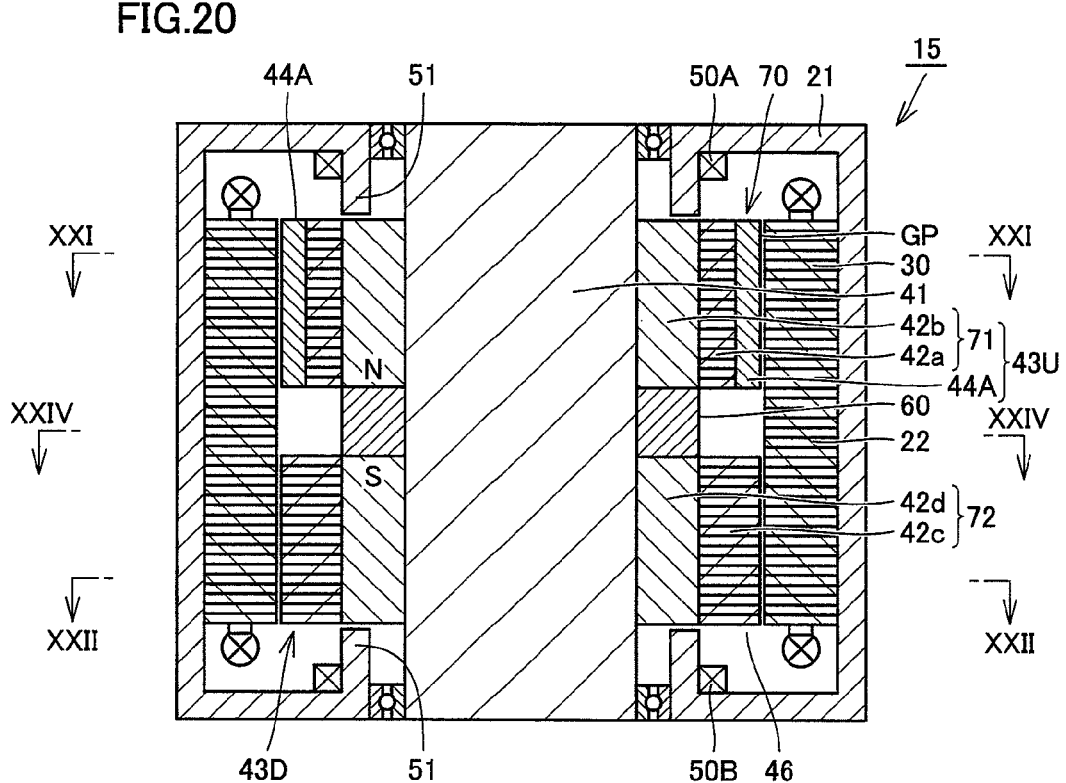
FIG. 20 is a sectional side view of an electric motor according to a variation example 4 of the embodiment of this invention.
Figure 21:
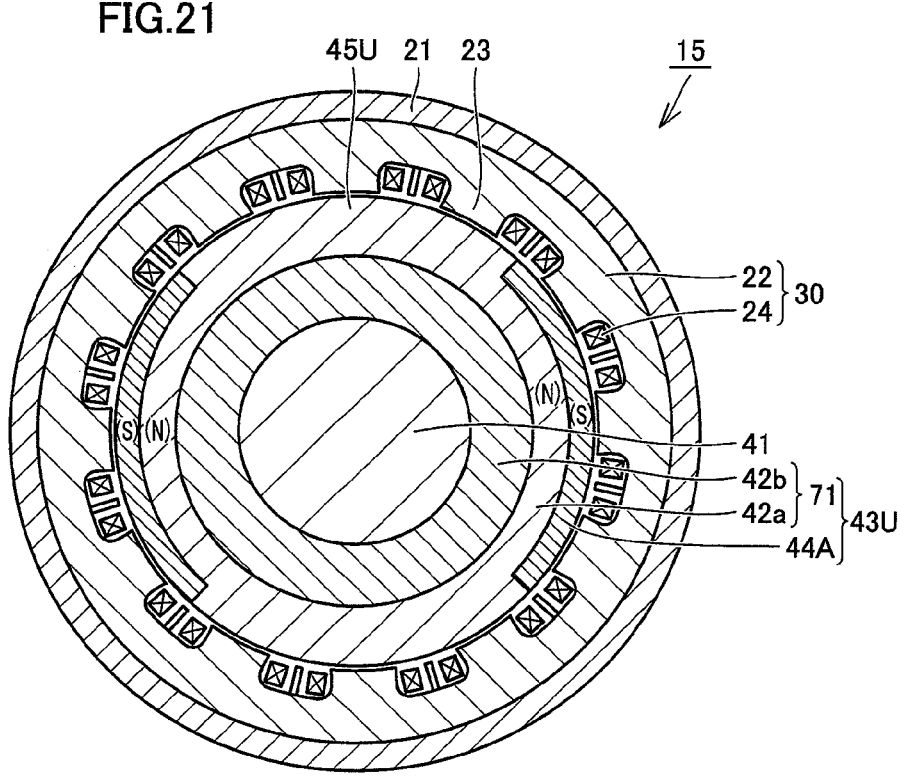
FIG. 21 is a sectional view taken along line XXI-XXI shown in FIG. 20.
Figure 22:
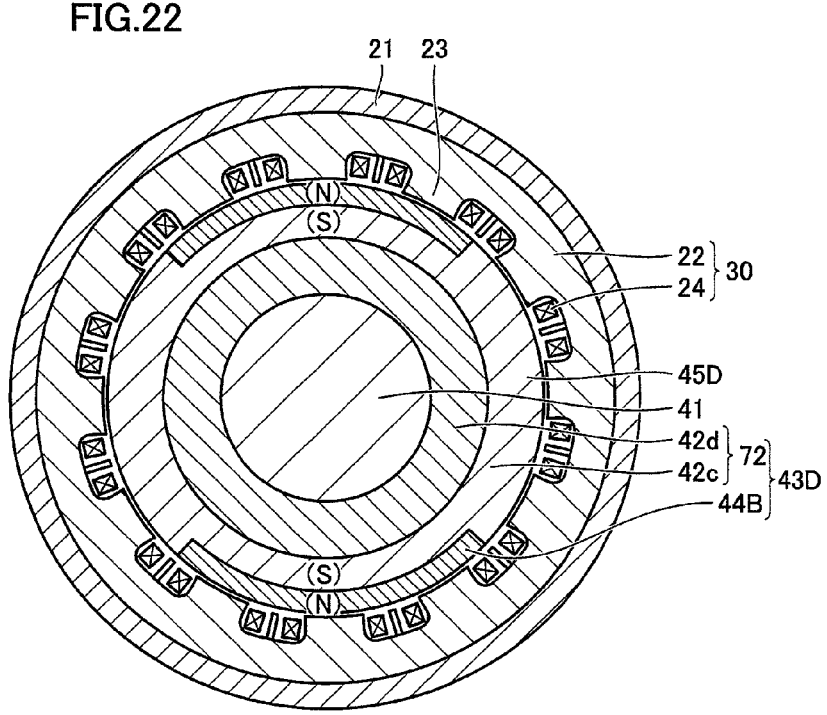
FIG. 22 is a sectional view taken along line XXII-XXII of FIG. 20.

FIG. 20 is a sectional side view of an electric motor 15 according to a variation example 4 of the embodiment of this invention. FIG. 21 is a sectional view taken along line XXI-XXI shown in FIG. 21. Further, FIG. 22 is a sectional view taken along line XXII-XXII of FIG. 21.

With reference to FIG. 20, electric motor 50 according to the present variation example is provided with stator 30 formed in a tubular shape, field yoke 21 provided in the outer periphery of stator 30 and formed so that the magnetic flux can pass through, rotation shaft 41 rotatably provided and arranged in stator 30, a rotor 70 fixedly installed in an outer surface of rotation shaft 41, and field coils 50A and 50B.

With reference to FIG. 21, stator 30 is provided with stator core 22 with stator teeth 23 formed in an inner periphery surface, and an armature winding 24 wound around stator core 22. As shown in FIGS. 20 and 21, rotor 70 is provided with an upper rotor 43U fixedly installed in rotation shaft 41, and a lower rotor 43D fixedly installed in rotation shaft 41 with a clearance relative to upper rotor 43U in the axial direction of rotation shaft 41.

Upper rotor 43U is fixedly installed in rotation shaft 41 and includes a rotor core (first rotor core) 71 with a plurality of rotor teeth 45U in an outer periphery surface, and a magnet 44A provided between rotor teeth 45U.

Rotor core 71 includes a tubular outer rotor core 42a, and an inner rotor core 42b arranged in an inner periphery of outer rotor core 42a and fixedly installed in rotation shaft 41.

Outer rotor core 42a is formed by laminating a plurality of magnetic steel plates in the axial direction, and there is a slight gap between the laminated steel plates. Inner rotor core 42b is made of an integral magnetic material (such as SMC). Therefore, magnetic resistance in the axial direction of inner rotor core 42b is smaller than magnetic resistance in the axial direction of outer rotor core 42a.

A plurality of rotor teeth 45U are formed on an outer surface of outer rotor core 42a at intervals in the circumferential direction. Rotor teeth 45U are extended from one end of outer rotor core 42a in the axial direction to the other end.

Magnet 44A is provided at a position adjacent to rotor teeth 45U in the circumferential direction of rotor core 71 and arranged so as to cover an outer surface of rotor core 71 positioned between rotor teeth 45U.

As shown in FIG. 22, lower rotor 43D is fixedly installed in rotation shaft 41 and includes a rotor core (second rotor core) 72 having a plurality of rotor teeth 45D in an outer surface, and a magnet 44B provided in rotor teeth 45D.

Rotor core 72 includes a tubular outer rotor core 42c, and an inner rotor core 42d arranged in an inner periphery of outer rotor core 42c and fixedly installed in rotation shaft 41.

Outer rotor core 42c is formed by laminating a plurality of magnetic steel plates in the axial direction, and there is a slight gap between the laminated steel plates. Inner rotor core 42d is made of a compact magnetic core. Therefore, magnetic resistance in the axial direction of inner rotor core 42d is smaller than magnetic resistance in the axial direction of outer rotor core 42c.

A plurality of rotor teeth 45D are formed on an outer surface of outer rotor core 42c at intervals in the circumferential direction. Rotor teeth 45D are extended from one end of outer rotor core 42c in the axial direction to the other end.

Rotor teeth 45D are provided at a position deviating from rotor teeth 45U shown in FIG. 21 in the circumferential direction of rotor core 72. That is, when seen from the top from the axial direction of rotation shaft 41, rotor teeth 45D are arranged so as to be positioned between rotor teeth 45U.

Here, in FIG. 21, the magnetic property of an outer periphery of magnet 44A is the S pole, and the magnetic property of the inner periphery side of magnet 44A is the N pole. That is, the S pole is arranged on the inside in the radial direction of rotor core 71, and the N pole is arranged on the outside in the radial direction. As shown in FIG. 22, the magnetic property of an outer periphery of magnet 44B is the N pole, and the magnetic property of the inner periphery side of magnet 44B is the S pole. That is, the S pole is arranged on the inside in the radial direction of rotor core 72, and the N pole is arranged on the outside in the radial direction. In such a way, magnet 44A and magnet 44B are provided so that the magnetic property of the outer periphery of magnet 44A and the magnetic property of the outer periphery of magnet 44B are different from each other.

Figure 23:
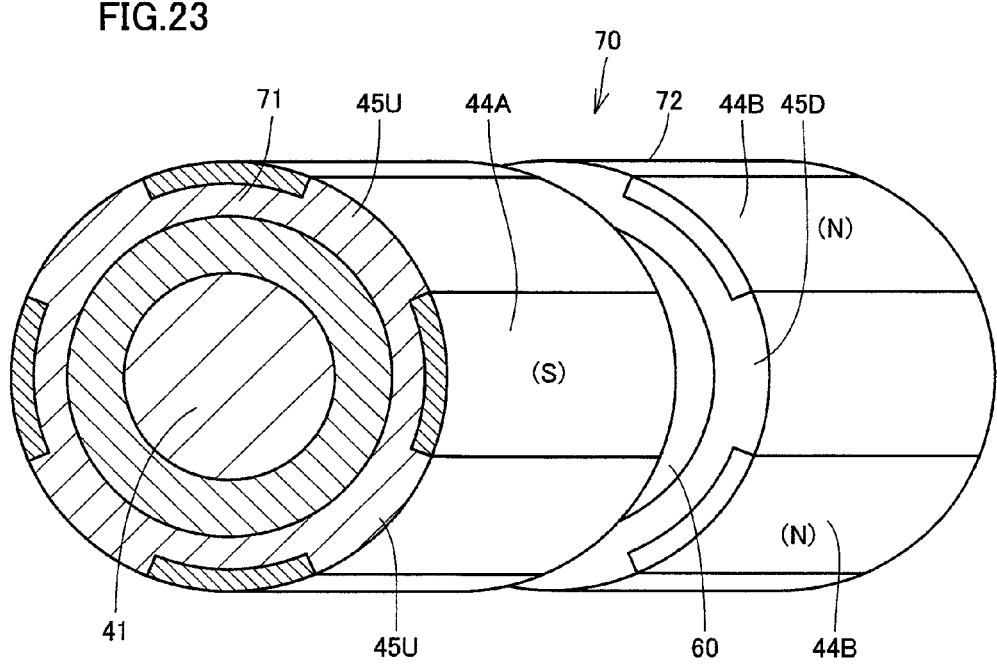
FIG. 23 is a perspective view of the rotor.

FIG. 23 is a perspective view of rotor 70. With reference to FIG. 23, rotor teeth 45D are positioned in the axial direction of rotation shaft 41 relative to magnet 44A. Rotor teeth 45U are positioned in the axial direction of rotation shat 41 relative to magnet 44B. In such a way, magnet 44A and magnet 44B are arranged so as to deviate from each other in the circumferential direction of rotor core 71.

In FIG. 20, field yoke 21 is provided from one end of stator core 22 in the axial direction to the other end and made of a compact magnetic core. Field yoke 21 is provided with protruding units 51 protruding towards upper rotor 43U and lower rotor 43D. Protruding units 51 protrude towards inner rotor cores 42b and 42d. Field coils 50A and 50B are formed by winding windings around protruding units 51.

Figure 24:
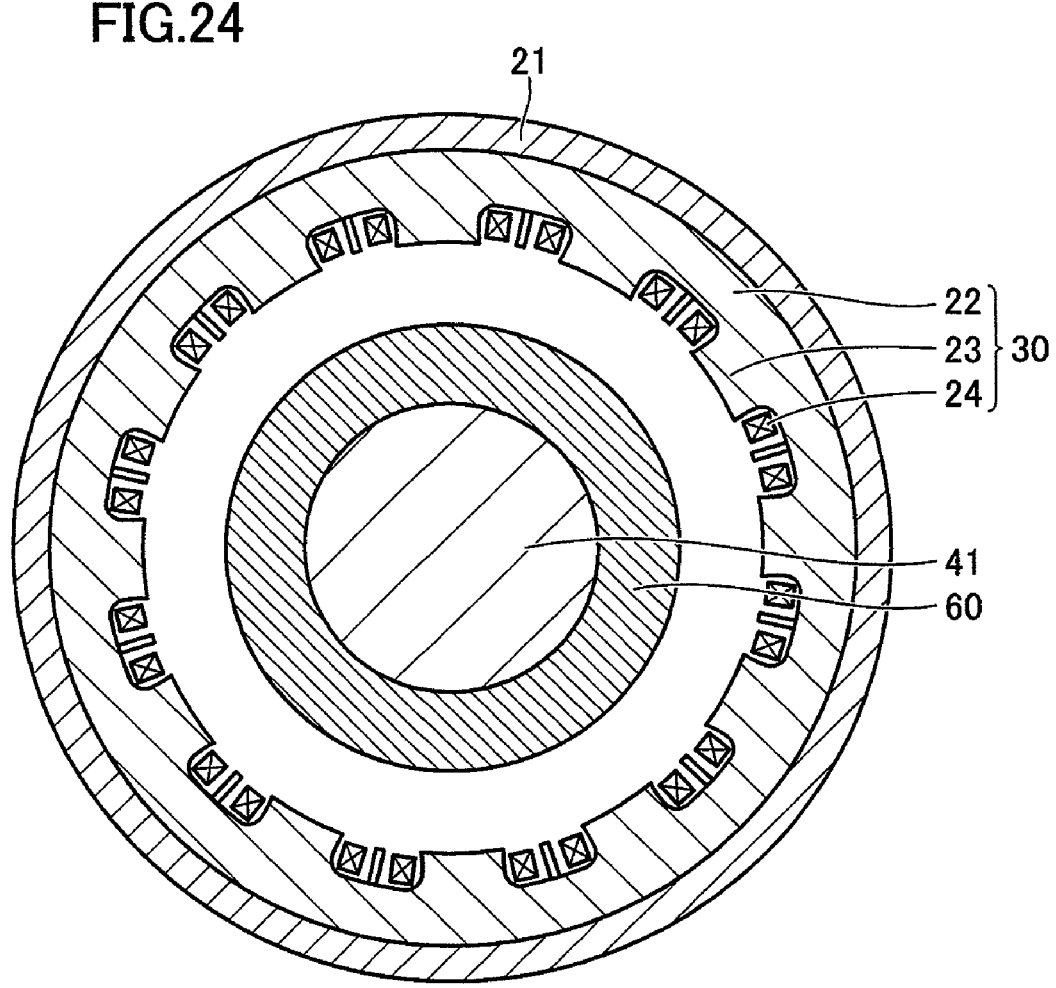
FIG. 24 is a sectional view taken along line XXIV-XXIV of FIG. 20.

FIG. 24 is a sectional view taken along line XXIV-XXIV of FIG. 20. As shown in FIGS. 21 and 24, a circular ring magnet 60 is fixedly installed in an outer surface of rotation shaft 41 positioned between rotor core 71 and rotor core 72. A pair of poles of ring magnet 60 are aligned in the axial direction of rotation shaft 41. An end surface of rotor core 71 side is the N pole, and an end surface of rotor core 72 side is the S pole.

Particularly, the end surfaces of ring magnet 60 in the axial direction are in contact with inner rotor cores 42b and 42d. An outer diameter of ring magnet 60 is smaller than inner diameters of outer rotor cores 42a and 42c.

In electric motor 15 configured as above, magnetic flux from ring magnet 60 proceeds in inner rotor core 42b in the axial direction. The magnetic flux is displaced into the radial direction at any position of inner rotor core 42b and comes into outer rotor core 42a. Next, the magnetic flux proceeds in outer rotor core 42a in the circumferential direction and the radial direction. When reaching to rotor teeth 45U, the magnetic flux comes into stator teeth 23 excited by the S pole via the air gap.

The magnetic flux coming into stator teeth 23 is displaced into the radial direction and the circumferential direction in stator core 22 and reaches to the interior of field yoke 21. The magnetic flux is changed into the circumferential direction and the axial direction in field yoke 21 and changed to the side of lower rotor 43D.

In lower rotor 43, the magnetic flux comes from field yoke 21 into stator core 22, and comes from stator teeth 23 excited by the N pole into rotor teeth 45U via the air gap. The magnetic flux is displaced into the axial direction in inner rotor core 42d and returns to the S pole of ring magnet 60.

Further, in the present variation example, magnet 44A provided in a surface of upper rotor 43U is made of a pair of magnets arranged so as to face each other via rotation shaft 41. When magnetic flux from a pair of these magnets comes from surfaces of the magnets on the inside in the radial direction into outer rotor core 42a, the magnetic flux is displaced into the circumferential direction in outer rotor core 42a, and comes from rotor teeth 45U into stator teeth 23 via the air gap.

The magnetic flux coming into stator teeth 23 is changed in stator core 22 and returns from stator teeth 23 to the magnet via the air gap.

Here, a region where the magnetic flux from ring magnet 60 can pass through the interior of outer rotor core 42a is regulated to the interior of rotor teeth 45U by the magnetic flux from magnet 44A. Thereby, it is possible to suppress that the magnetic flux from ring magnet 60 comes from a region other than rotor teeth 45U towards stator core 22 so as to reduce so-called leakage magnetic flux. As a result, it is possible to improve rotation force added to upper rotor 43U.

Similarly, magnet 44B provided in a surface of lower rotor 43D is also made of a pair of magnets arranged so as to face each other via rotation shaft 41. A region where the magnetic flux from ring magnet 60 can come from stator core 22 into outer rotor core 42c due to magnetic flux from this magnet 44B is regulated to a region where stator core 22 and rotor teeth 45D face each other. Thereby, it is possible to reduce the leakage magnetic flux and improve rotation force added to lower rotor 43D.

In the case of performing the stronger field control of electric motor 15 according to variation example 4, the electric current is supplied to field coils 50A and 50B. At this time, the electric current is supplied to field coil 50A so as to form a magnetic circuit where magnetic flux generated by field coil 50A comes from protruding units 51 of field toke 21 into inner rotor core 42b, and then reaches from outer rotor core 42a to field yoke 21 via the air gap and stator core 22.

The electric current is supplied to field coil 50B so as to form a magnetic circuit where magnetic flux generated by field coil 50B comes from the side wall unit of field yoke 21 into stator core 22, and then comes from an end of inner rotor core 42d in the axial direction into protruding units 51 of field yoke 21 via the air gap.

Thereby, the magnetic flux from field coil 50A reaches from rotor teeth 45U to stator teeth 23 as well as the magnetic flux from ring magnet 60. Therefore, the magnetic flux from field coil 50A cooperates with the magnetic flux from ring magnet 60 and accelerates upper rotor 43U towards the rotation direction.

The magnetic flux from field coil 50B reaches from stator teeth 23 to rotor teeth 45D as well as the magnetic flux from ring magnet 60. Therefore, the magnetic flux from field coil 50B cooperates with the magnetic flux from ring magnet 60 and accelerates lower rotor 43D towards the rotation direction.

As a result, even when the revolution speed of rotor 70 is low, it is possible to generate large torque in rotor 70.

It should be noted that although the magnet is provided in the outer surface of the rotor in electric motor 10 and variation examples 1, 2 and 4 mentioned above, the electric motor is not limited thereto but the magnet may be buried in the rotor. That is, the drive device of the electric motor according to the present invention can be applied not only to a SPM (Surface Permanent Magnet) but also to an IPM (Interior Permanent Magnet). In the rotor configured as above, it is possible to effectively utilize both magnet torque (attractive and repulsive force between a permanent magnet and the coil) and reluctance torque (force of making a curve of the magnetic line to be straight=force of coil for attracting iron).

The embodiment disclosed herein is not restrictive but an example in all respects. A scope of the present invention is not shown by the above description but claims. The present invention should include all variations within similar meanings and ranges to the claims.

Industrial Applicability

This invention can be applied to a drive device of an electric motor capable of adjusting content of armature interlinkage magnetic flux.

The invention claimed is:

1. A drive device for an electric motor including a field winding and having a field pole formed by a field current passing through said field winding, comprising:
   a power source;
   a converter for converting output voltage of said power source and outputting the voltage between first and second power lines; and
   an inverter receiving the voltage between the first and second power lines and converting the voltage into electric power for driving and controlling said electric motor, wherein
   said converter includes a voltage boosting switching element to be electrically connected between said field winding and said second power wire,
   said field winding is electrically connected onto an electric current channel between said power source and said first power line and formed so that voltage switched by said voltage boosting switching element is applied to both ends, and
   said drive device of the electric motor further comprises:
   a field switching element to be connected in parallel to said field winding; and
   a controller controlling said field current and adjusting density of magnetic flux between a rotor and a stator by performing switching control on said voltage boosting switching element and said field switching element, and also controlling a voltage boosting current outputted from said converter to said first power line and converting the output voltage of said power source into voltage in accordance with a voltage command value.

2. The drive device of the electric motor according to claim 1, wherein
   said controller includes:
   target current setting unit setting a target value of said field current and a target value of said voltage boosting current in accordance with the revolution speed of said electric motor and demanded torque;
   duty ratio calculating unit calculating a duty ratio between said voltage boosting switching element and said field switching element based on the target values of said field current and said voltage boosting current; and
   control signal generating unit generating a switching control signal for switching said voltage boosting switching element and said field switching element in accordance with said calculated duty ratio.

3. The drive device of the electric motor according to claim 2, wherein
   said control signal generating unit generates said switching control signal so that a time period when only said voltage boosting switching element is turned ON, a time period when said voltage boosting switching element and said field switching element are turned OFF, and a time period when only said field switching element is turned ON are provided in accordance with said duty ratio.

4. The drive device of the electric motor according to claim 2, further comprising:
   a bypass switching element forming the electric current channel between said power source and said first power wire so as to bypass said field winding, wherein
   said duty ratio calculating unit sets on-duty of said bypass switching element to be one in the case where said voltage command value is equal to the output voltage of said power source and the target value of said field current is not more than a predetermined value, and
   said control signal generating unit generates said switching control signal so that said bypass switching element is turned ON and said voltage boosting switching element and said field switching element are turned OFF in accordance with said on-duty.

5. The drive device of the electric motor according to claim 2, wherein
   said electric motor is formed so as to be capable of generating drive force of a vehicle,
   said controller further includes:
   unit calculating demand drive force of said vehicle based on an accelerator operation by a driver of said vehicle and calculating torque demanded for said electric motor from the calculated demand drive force of said vehicle; and
   unit setting said voltage command value in accordance with the revolution speed of said electric motor and the torque demanded for said electric motor,
   said duty ratio calculating unit calculates the duty ratio between said voltage boosting switching element and said field switching element based on the target value of said field current in the case where the revolution speed of said electric motor is in a predetermined region of the revolution speed where said voltage command value is equal to the output voltage of said power source, and
   said control signal generating unit generates said switching control signal so that a time period when only said voltage boosting switching element is turned ON, a time period when said voltage boosting switching element and said field switching element are turned OFF, and a time period when only said field switching element is turned ON are provided in accordance with said duty ratio.

6. The drive device of the electric motor according to claim 5, wherein
   said duty ratio calculating unit calculates the duty ratio between said voltage boosting switching element and said field switching element based on the target values of said field current and said voltage boosting current in the case where the revolution speed of said electric motor exceeds said predetermined region of the revolution speed.

7. The drive device of the electric motor according to claim 6, further comprising:
a bypass switching element forming the electric current channel between said power source and said first power wire so as to bypass said field winding, wherein
said duty ratio calculating unit sets on-duty of said bypass switching element to be one in the case where the torque demanded for said electric motor is less than maximum torque to be outputted by said electric motor, and
said control signal generating unit generates said switching control signal so that said bypass switching element is turned ON and said voltage boosting switching element and said field switching element are turned OFF in accordance with said on-duty.

8. The drive device of the electric motor according to claim 1, wherein
said electric motor includes:
a rotatable rotation shaft;
a rotor core fixedly installed in said rotation shaft;
a magnet provided in said rotor core so that a pair of poles of different magnetic properties are aligned in the radial direction of said rotor core;
a stator core formed in a tubular shape;
a field yoke provided in an outer periphery of said stator core; and
a field winding formed so as to be capable of controlling density of magnetic flux between said rotor core and said stator core by forming a magnetic circuit between said field yoke and said rotor core.

9. The drive device of the electric motor according to claim 8, wherein
said rotor core has a tubular first rotor core formed by laminating a plurality of steel plates and a second rotor core provided in an inner periphery of said first rotor core and made of an integrally molded magnetic material, and
said field yoke is made of an integrally molded magnetic material.

10. The drive device of the electric motor according to claim 9, wherein
said rotor core further has a protruding polar unit provided in an outer surface of said first rotor core so as to protrude towards the outside in the radial direction, and
said magnet is provided in the outer surface of said first rotor core at a position adjacent to said protruding polar unit in the circumferential direction.

11. The drive device of the electric motor according to claim 10, wherein
said magnet has a first magnet and second magnets provided at positions adjacent to said first magnet in the circumferential direction, and
said first magnet and said second magnets are provided so that poles of parts positioned in the outer surface of said first rotor core are different from each other.

12. The drive device of the electric motor according to claim 9, wherein
said magnet has a first magnet and a second magnet provided in an outer surface of said first rotor core so as to be adjacent to each other in the circumferential direction,
said first magnet is formed so as to be longer than said second magnet in the axial direction of said rotor core, and said first rotor core is formed between said first magnets and at a position adjacent to said second magnet in the axial direction of said rotor core and has a protruding polar unit provided so as to protrude towards the outside in said radial direction.

13. The drive device of the electric motor according to claim 9, wherein
said magnet is buried in said first rotor core.

14. The drive device of the electric motor according to claim 1, wherein
said electric motor includes:
a rotatable rotation shaft;
a rotor core fixedly installed in said rotation shaft;
a protruding polar unit provided in an outer surface of said rotor core so as to protrude towards the outside in the radial direction;
a stator core formed in a tubular shape;
a field yoke provided in an outer periphery of said stator core; and
field winding formed so as to be capable of controlling density of magnetic flux between said rotor core and said stator core by forming a magnetic circuit between said field yoke and said rotor core.

15. The drive device of the electric motor according to claim 14, wherein
said rotor core has a tubular first rotor core formed by laminating a plurality of steel plates and a second rotor core provided in an inner periphery of said first rotor core and made of an integrally molded magnetic material, and
said field yoke is made of an integrally molded magnetic material.

16. The drive device of the electric motor according to claim 1, wherein
said electric motor includes:
a stator core formed in a tubular shape;
a field yoke provided in an outer periphery of said stator core;
a rotation shaft rotatably provided on the inner periphery side of said stator core;
a first rotor core and a second rotor core fixedly installed in said rotation shaft so as to be adjacent to said rotation shaft along the axial direction of said rotation shaft;
a first magnet fixedly installed in said rotation shaft positioned between said first rotor core and said second rotor core with a pair of poles to be arranged in the axial direction of said rotation shaft;
a first protruding polar unit provided in an outer surface of said first rotor core so as to protrude towards the outside in the radial direction;
a second magnet provided at a position adjacent to said first protruding polar unit in the circumferential direction;
a second protruding polar unit provided in an outer surface of said second rotor core so as to protrude towards the outside in the radial direction and deviate from said first protruding polar unit in the circumferential direction;
a third magnet provided at a position adjacent to said second protruding polar unit in the circumferential direction; and
field windings formed so as to be capable of controlling density of magnetic flux between at least one of said first rotor core and said second rotor core and said stator core by forming a magnetic circuit between at least one of said first rotor core and said second rotor core and said field yoke.

17. The drive device of the electric motor according to claim 16, wherein said second magnet and said third magnet are provided so that poles of parts respectively positioned in the outer surfaces of said first rotor core and said second rotor core are different from each other.

18. The drive device of the electric motor according to claim 17, wherein said first rotor core and said second rotor core respectively have tubular outer rotor cores formed by laminating a plurality of steel plates and inner rotor cores provided in inner peripheries of said outer rotor cores and made of an integrally molded magnetic material, and said field yoke is made of an integrally molded magnetic material.

* * * * *

UNITED STATES PATENT AND TRADEMARK OFFICE
CERTIFICATE OF CORRECTION

| | | |
|---|---|---|
| PATENT NO. | : 8,044,633 B2 | Page 1 of 1 |
| APPLICATION NO. | : 12/514413 | |
| DATED | : October 25, 2011 | |
| INVENTOR(S) | : Kazutaka Tatematsu et al. | |

It is certified that error appears in the above-identified patent and that said Letters Patent is hereby corrected as shown below:

Title page, item (73) should read

--(73)   Assignee:   Toyota Jidosha Kabushiki Kaisha,
Aichi-Ken (JP)

National University Corporation Nagoya Institute of Technology,
Aichi-Ken (JP)--

Signed and Sealed this
Tenth Day of January, 2012

David J. Kappos
*Director of the United States Patent and Trademark Office*